US012212092B2

(12) United States Patent
Augdahl et al.

(10) Patent No.: US 12,212,092 B2
(45) Date of Patent: *Jan. 28, 2025

(54) POWER CABLE CONNECTORS AND ASSEMBLIES

(71) Applicant: Outdoor Wireless Networks LLC, Claremont, NC (US)

(72) Inventors: Peter C. Augdahl, Prior Lake, MN (US); Thomas B. Marcouiller, Shakopee, MN (US); Oscar Bran de León, Yuma, AZ (US); Maurizio Basso, Milan (IT)

(73) Assignee: Outdoor Wireless Networks LLC, Claremont, NC (US)

( * ) Notice: Subject to any disclaimer, the term of this patent is extended or adjusted under 35 U.S.C. 154(b) by 33 days.

This patent is subject to a terminal disclaimer.

(21) Appl. No.: 18/299,968

(22) Filed: Apr. 13, 2023

(65) Prior Publication Data

US 2023/0253728 A1 Aug. 10, 2023

Related U.S. Application Data

(63) Continuation of application No. 17/349,163, filed on Jun. 16, 2021, now Pat. No. 11,658,436.

(Continued)

(51) Int. Cl.

*H01R 13/58* (2006.01)

*H01R 13/512* (2006.01)

(Continued)

(52) U.S. Cl.

CPC ....... *H01R 13/512* (2013.01); *H01R 13/5202* (2013.01); *H01R 13/5208* (2013.01);

(Continued)

(58) Field of Classification Search

CPC .............. H01R 13/512; H01R 13/5202; H01R 13/5208; H01R 13/5812; H01R 13/625; H01R 43/20; H01R 43/28; H01R 4/72

(Continued)

(56) References Cited

U.S. PATENT DOCUMENTS 3,986,765 A 10/1976 Shaffer et al.

4,310,213 A * 1/1982 Fetterolf, Sr. ........ H01R 13/516 439/469

(Continued)

FOREIGN PATENT DOCUMENTS

CN 206099005 U 4/2017

KR 101290687 B1 7/2013

OTHER PUBLICATIONS

PCT Notification of Transmittal of the International Search Report and the Written Opinion of the International Searching Authority, or the Declaration, mailed Oct. 5, 2021, for corresponding PCT International Application No. PCT/US2021/037536.

*Primary Examiner* — Abdullah A Riyami

*Assistant Examiner* — Vladimir Imas

(74) *Attorney, Agent, or Firm* — Myers Bigel, P.A.

(57) ABSTRACT

The present disclosure describes a power cable connector. The connector includes a main body having a bore therethrough, a first threaded section, and a second threaded section; a back cover having a third threaded section configured engage the first threaded section of the main body; a pair of female conductor pins configured to be coupled to inner conductors of a power cable; an insulator having one or more recesses extending along an outer surface and a fourth threaded section configured to engage with the second threaded section of the main body, the insulator having a pair of inner channels extending therethrough sized to receive the pair of female conductor pins; an end cap including one or more recesses; and a locking nut including one or more (Continued)

protrusions extending radially inward. When the locking nut is inserted onto the insulator and end cap, the one or more recesses of the insulator and one or more recesses of the end cap are configured to receive and guide the one or more protrusions of the locking nut to secure the end cap to the insulator. Connector assemblies are also described herein.

17 Claims, 19 Drawing Sheets

Related U.S. Application Data

(60) Provisional application No. 63/047,213, filed on Jul. 1, 2020.

(51) Int. Cl.
*H01R 13/52* (2006.01)
*H01R 13/625* (2006.01)
*H01R 43/20* (2006.01)
*H01R 43/28* (2006.01)
*H01R 4/72* (2006.01)

(52) U.S. Cl.
CPC ....... *H01R 13/5812* (2013.01); *H01R 13/625* (2013.01); *H01R 43/20* (2013.01); *H01R 43/28* (2013.01); *H01R 4/72* (2013.01)

(58) Field of Classification Search
USPC .......................................................... 439/460
See application file for complete search history.

(56) References Cited

U.S. PATENT DOCUMENTS 4,759,722 A 7/1988 Song
4,766,441 A 8/1988 Phillips et al.
5,106,323 A 4/1992 Gerhard
5,151,053 A * 9/1992 Shinji .................. H01R 24/568 439/98
5,252,088 A * 10/1993 Morello ............. H01R 13/4364 439/271
5,618,204 A * 4/1997 Nix .................... H01R 13/6456 439/271
5,756,972 A 5/1998 Vranicar et al.
5,890,925 A 4/1999 Bernardini
5,890,930 A 4/1999 Gerow
6,036,500 A 3/2000 Francis et al.
6,039,609 A 3/2000 Hauver et al.
6,220,888 B1 4/2001 Correa
6,713,711 B2 * 3/2004 Conway ............... H05H 1/3423 219/121.48
6,776,639 B1 * 8/2004 Dennis ............... H01R 13/5219 439/314
7,134,911 B2 11/2006 Bernhart et al.
7,241,164 B2 7/2007 Holliday
7,303,418 B2 * 12/2007 O'Connor .......... H01R 13/5208 439/369
7,422,463 B2 9/2008 Kuo
7,601,019 B2 10/2009 Hsieh et al.
7,878,868 B2 2/2011 Mech et al.
8,328,574 B1 12/2012 Lin
8,657,624 B2 2/2014 Yoshida
8,827,729 B2 9/2014 Gunreben et al.
8,926,362 B2 1/2015 Xu et al.
9,048,573 B2 * 6/2015 Grzegorzewska ... H01R 13/625
9,337,570 B2 5/2016 Nagaki et al.
9,368,907 B2 6/2016 Becker
9,618,701 B2 4/2017 Mooij et al.
9,887,489 B1 * 2/2018 Dietz .................. H01R 13/193
10,074,924 B2 9/2018 Yamanaka
10,283,903 B2 5/2019 Yamanaka
10,367,298 B2 * 7/2019 Plested ................ H01R 13/639
10,574,001 B2 2/2020 Patel et al.
10,677,998 B2 6/2020 Van Baelen et al.
10,931,068 B2 2/2021 Purdy et al.
11,223,163 B2 1/2022 Becavin et al.
11,251,563 B1 2/2022 Whitley et al.
11,404,816 B2 8/2022 Schüssler et al.
2005/0026497 A1 2/2005 Holliday
2007/0264880 A1 * 11/2007 Schiffer ............. H01R 13/5202 439/752
2008/0171456 A1 * 7/2008 Vanzo .................. H01R 13/625 29/882
2010/0255721 A1 * 10/2010 Purdy .................. H01R 9/0521 439/583
2014/0273540 A1 9/2014 Brown
2018/0131129 A1 * 5/2018 Plested .................. H01R 43/26
2019/0067858 A1 * 2/2019 Kloss ....................... H01R 4/50
2019/0369336 A1 12/2019 Van Baelen et al.

* cited by examiner

POWER CABLE CONNECTORS AND ASSEMBLIES

RELATED APPLICATION(S)

The present application is a continuation of U.S. patent application Ser. No. 17/349,163, filed Jun. 16, 2021 which claims priority from and the benefit of U.S. Provisional Application Ser. No. 63/047,213, filed Jul. 1, 2020, the disclosure of which is hereby incorporated herein in its entirety.

FIELD

The present application is directed generally toward telecommunications equipment, and more particularly, power cable connectors and power cable connector assemblies.

BACKGROUND

Power cables for telecommunications equipment are available in a variety of sizes. A majority of the time larger diameter power trunk cables are used at the bottom of an antenna tower and the smaller diameter power jumper cables are used at the top of the antenna tower. The larger diameter cables have less electrical resistance, but are heavier and more expensive because of the amount of copper used. Typically, a terminal block is used when transitioning from larger diameter cables to smaller diameter cables. However, different terminal blocks are needed for different sized cables making installation difficult and labor intensive for a technician, thereby increasing costs. There may be a need for power cable connectors that allow for the connection of multiple different sizes of conductor power cables, while also reducing installation time and reducing costs.

SUMMARY

A first aspect of the present invention is directed to a power cable connector. The connector including a main body having a bore therethrough, a first threaded section, and a second threaded section; a back cover having a third threaded section configured engage the first threaded section of the main body; a pair of female conductor pins configured to be coupled to inner conductors of a power cable; an insulator having one or more recesses extending along an outer surface and a fourth threaded section configured to engage with the second threaded section of the main body, the insulator having a pair of inner channels extending therethrough sized to receive the pair of female conductor pins; an end cap including one or more recesses; and a locking nut including one or more protrusions extending radially inward. When the locking nut is inserted onto the insulator and end cap, the one or more recesses of the insulator and one or more recesses of the end cap are configured to receive and guide the one or more protrusions of the locking nut to secure the end cap to the insulator.

Another aspect of the present invention is directed to a power cable connector. The connector including a generally cylindrical main body having a bore therethrough; a back cover configured to be removably secured to an end of the main body; a first seal sized to fit within at least a portion of the bore of the main body; a pair of female conductor pins configured to be coupled to the inner conductors of a power cable; an insulator having a pair of inner channels sized to receive the pair of female conductor pins, wherein the insulator is configured to be removably secured to an opposing end of the main body; a second seal sized to fit within at least a portion of the insulator; a coupler having a main body and a pair of mating sections extending axially in opposing directions from the main body, the end of each mating section including an aperture configured to receive a portion of the insulator within an interior cavity of each mating section, the coupler further including a pair of conductor pins extending through the main body, opposing ends of the conductor pins residing within respective interior cavities of the mating sections and configured to be received within a respective inner channel of the insulator; and a third seal residing between the insulator and the coupler.

Another aspect of the present invention is directed to a power cable connector assembly. The assembly including a power cable connector coupler, and a pair of power cable connectors. The power cable connector coupler has a main body and a pair of mating sections extending axially in opposing directions from the main body, the end of each mating section including an aperture extending into an interior cavity, the power cable connector coupler including a pair of conductor pins extending through the main body, wherein opposing ends of the conductor pins reside within respective interior cavities of the mating sections. Each of power cable connectors include a main body having a bore therethrough; a back cover configured to be removably secured to an end of the main body; a first seal sized to fit within at least a portion of the bore of the main body; a pair of female conductor pins configured to be coupled to inner conductors of a power cable; an insulator having a pair of inner channels sized to receive the pair of female conductor pins, wherein the insulator is configured to be removably secured to an opposing end of the main body and at least a portion of the insulator is configured to be received by the aperture and into the interior cavity of a respective mating section of the power cable connector coupler; a second seal sized to fit within at least a portion of the insulator; a third seal residing between the insulator and the power cable connector coupler; and a locking nut configured to secure the power cable connector coupler to the insulator. One of the power cable connectors is secured to one of the mating sections of the power cable connector coupler and the other power cable connector is secured to the opposing mating section of the power cable connector coupler.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim and/or file any new claim accordingly, including the right to be able to amend any originally filed claim to depend from and/or incorporate any feature of any other claim or claims although not originally claimed in that manner. These and other objects and/or aspects of the present invention are explained in detail in the specification set forth below. Further features, advantages and details of the present invention will be appreciated by those of ordinary skill in the art from a reading of the figures and the detailed description of the preferred embodiments that follow, such description being merely illustrative of the present invention.

DETAILED DESCRIPTION

Figure 1A:
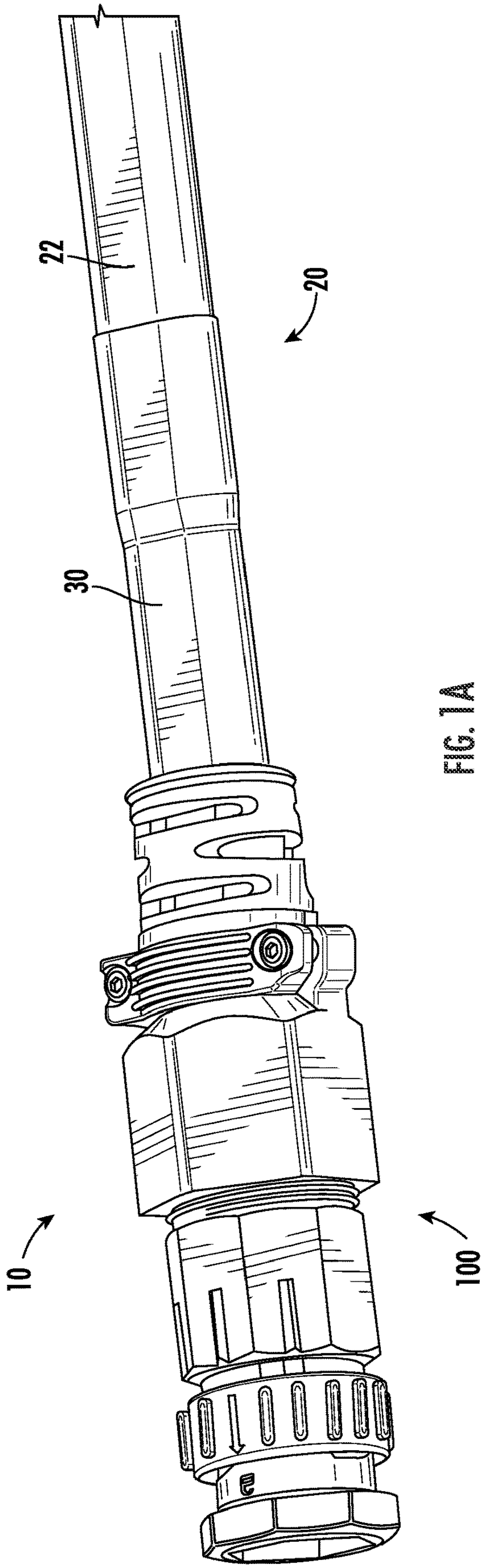
FIG. 1A is a perspective view of a connector assembly according to embodiments of the present invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The present invention now will be described more fully hereinafter with reference to the accompanying drawings, in which illustrative embodiments of the invention are shown. Like numbers refer to like elements throughout and different embodiments of like elements can be designated using a different number of superscript indicator apostrophes (e.g., 10', 10", 10''').

In the figures, certain layers, components, or features may be exaggerated for clarity, and broken lines illustrate optional features or operations unless specified otherwise. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer, or section. Thus, a first element, component, region, layer, or section discussed below could be termed a second element, component, region, layer or section without departing from the teachings of the present invention. The sequence of operations (or steps) is not limited to the order presented in the claims or figures unless specifically indicated otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Pursuant to embodiments of the present invention, a power cable connector is provided that allows for the connection of multiple different sizes of conductor power cables. Power cable connector assemblies, methods of assembling a power cable connector, and couplers are also provided herein. Embodiments of the present invention will now be discussed in greater detail with reference to FIGS. 1A-16C.

Figure 1B:
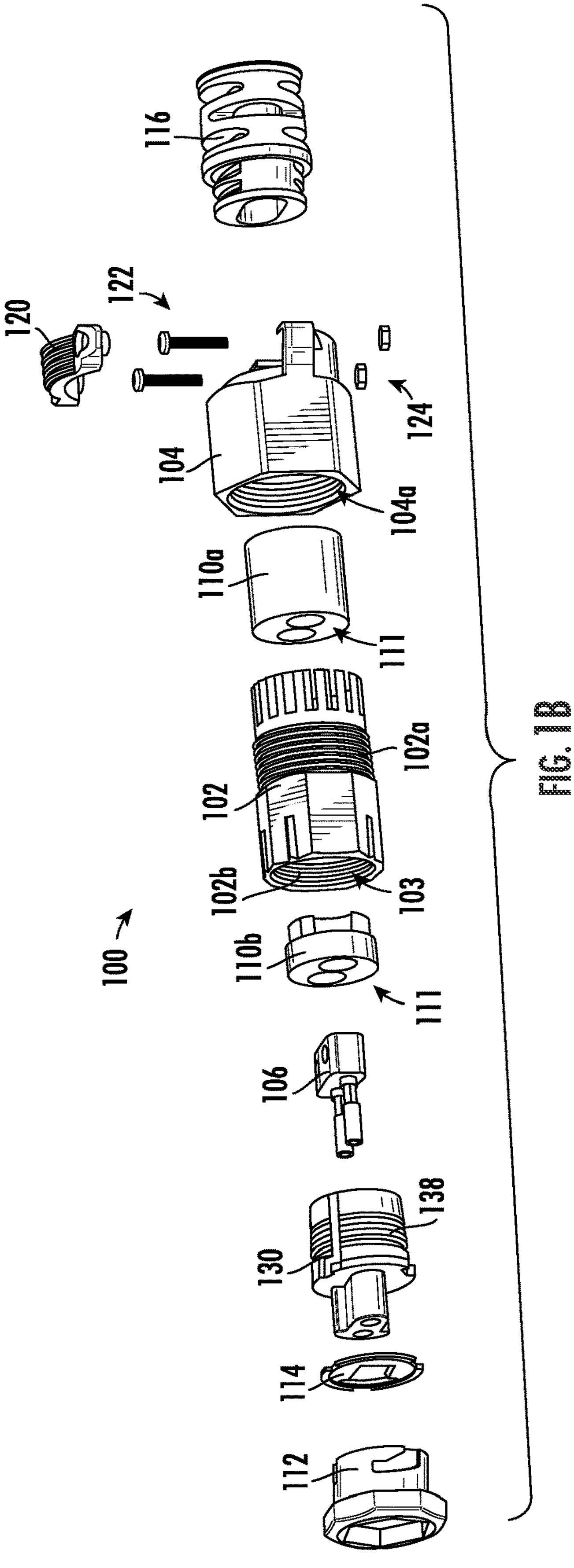
FIG. 1B is an exploded view of the connector assembly of FIG. 1A.

Referring now to the drawings, a power cable connector assembly 10 according to embodiments of the present invention is shown in FIGS. 1A-1B. As shown in FIG. 1A, the power cable connector assembly 10 may include a power cable 20 and a power cable connector 100. In some embodiments, the assembly 10 may further include a heat shrink tube 30. As discussed in further detail below, in some embodiments, the heat shrink tube 30 may extend over at least a portion of an outer sleeve 22 of the power cable 20 and extend within at least a portion of the power cable connector 100 to create a seal, thereby protecting the interconnection between the power cable 20 and the power cable connector 100.

FIG. 1B is an exploded view of the power cable connector 100 of FIG. 1A. As shown in FIG. 1B, in some embodiments, the connector 100 may include a main body 102, a back cover 104 and an insulator 130. The main body 102 has a bore (or interior cavity) 103 therethrough. In some embodiments, the main body 102 may have a generally cylindrical shape. The main body 102 is configured to be removably secured to the insulator 130 and the back cover 104. For example, in some embodiments, the main body 102 may comprise a first threaded section 102*a* that corresponds to a threaded section 104*a* of the back cover 104 and a second threaded section 102*b* that corresponds to a threaded section 138 of the insulator 130 (see also, e.g., FIG. 3A, FIG. 5A, FIG. 9B, FIG. 11B).

The connector 100 further includes a first seal 110*a* and a second seal 110*b*. The first seal 110*a* is configured and sized to form an interference fit within the main body 102. In some embodiments, the main body 102 may comprise a clamp ring (or a plurality of spring fingers) 102*c* configured to engage the first seal 110*a* (see, e.g., FIGS. 10A-10C). The second seal 110*b* is configured and sized to form an interference fit with the insulator 130 (see, e.g., FIGS. 8A-8B). As discussed in further detail below, different first and second seals 110*a*, 110*b* may be used with the connector 100 to accommodate different sized conductor power cables 22.

Each seal 110*a*, 110*b* comprises two apertures 111. The apertures 111 are sized to form an interference fit with a specific-sized conductor power cable 22 and corresponding seals 110*a*, 110*b* may be used for different sized power cables 22. For example, in some embodiments, seals 110*a*, 110*b* with apertures 111 having a size of about 6 $mm^2$ would be used to accommodate conductors 24 having a similar size. However, if the conductors 24 have a size of about 25 $mm^2$, then the seals 110*a*, 110*b* with 6 $mm^2$ apertures 111 would be replaced with different seals 110*a*, 110*b* having a size of about 25 $mm^2$ to accommodate the conductors 24 having a similar size. Thus, the power cable connectors 100 of the present invention allow for the connection of multiple different sizes of conductor power cables 20.

In some embodiments, the first and second seals 110*a*, 110*b* may be color-coded to help installers match the appropriately sized seals 110*a*, 110*b* with a specific-sized conductor power cable 22. In some embodiments, the power cable connector 100 of the present invention may be used to accommodate power cables 20 with conductors 24 having a size between 6 $mm^2$ and about 25 $mm^2$.

The connector 100 of the present invention further includes a pair of female connector pins 106 (i.e., positive and negative polarity). The female connector pins 106 correspond to the size of the inner conductors 26 of the power cable 22. The female connector pins 106 are configured to be inserted into the insulator 130. In some embodiments, interior channels 132*a* of the insulator 130 are configured such that the female connector pins 106 may only be inserted one way (see, e.g., FIGS. 5A-5B and FIGS. 7A-7B).

The connector 100 further includes an end cap 112. The end cap 112 is configured to receive a portion of the insulator 130 (see, e.g., FIGS. 5A-5C). As discussed in further detail below, the end cap 112 may be secured to the insulator 130 via a locking nut 140 (see, e.g., FIGS. 6A-6E). In some embodiments, the locking nut 140 may be configured to implement a "bayonet" locking mechanism. A third seal 114 may reside between the insulator 130 and the end cap 112. In some embodiments, the third seal 114 may be an O-ring.

In some embodiments, the power cable connector 100 of the present invention may further include a strain relief boot 116. The strain relief boot 116 may be secured to the back cover 104 with a clamp 120 and a couple screws 122 and nuts 124 (see, e.g., FIGS. 13A-13B). Other known methods of securing the strain relief boot 116 to the back cover 104 may be used.

Referring to FIGS. 2A-13B, a method of installing a power cable connector assembly 10 according to embodiments of the present invention is illustrated.

Figure 2A:
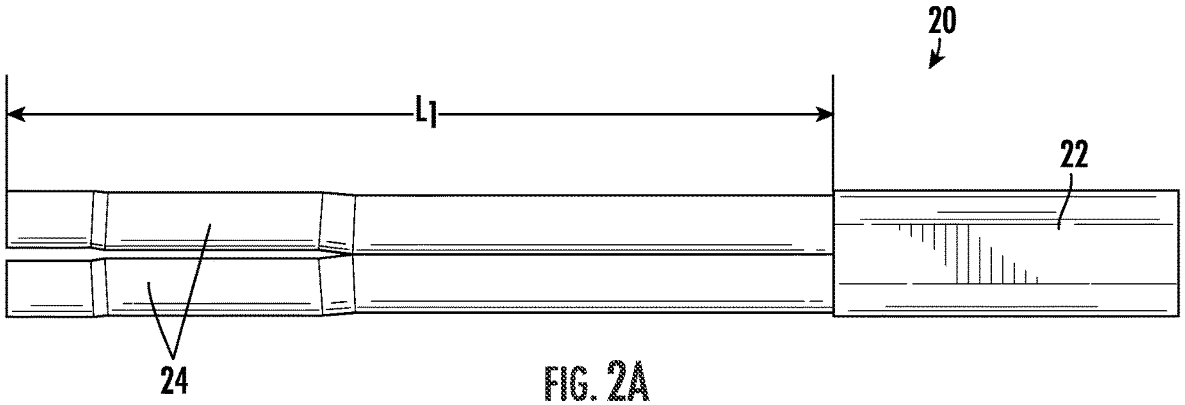
FIGS. 2A-2C, 3A-3B, 4A-4B, 5A-5C, 6A-6F, 7A-7B, 8A-8B, 9A-9B, 10A-10C, 11A-11B, 12A-12B, and 13A-13B illustrate an exemplary method of assembling a connector assembly according to embodiments of the present invention.
Figure 2B:
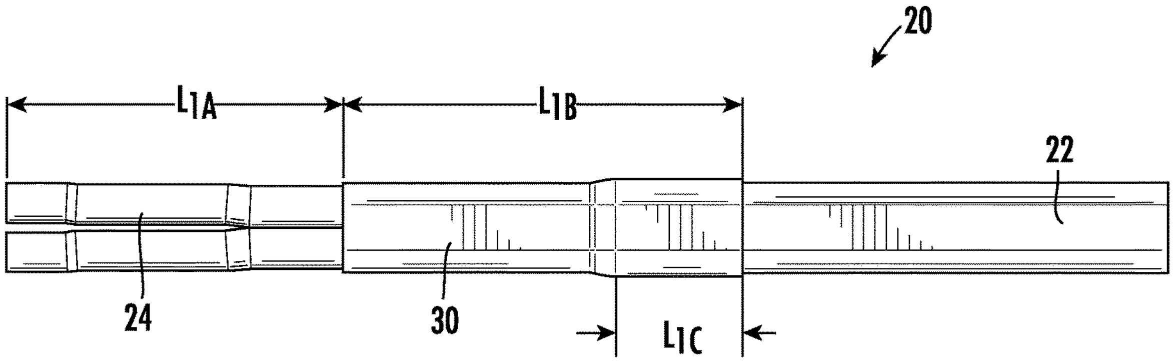
Figure 2C:
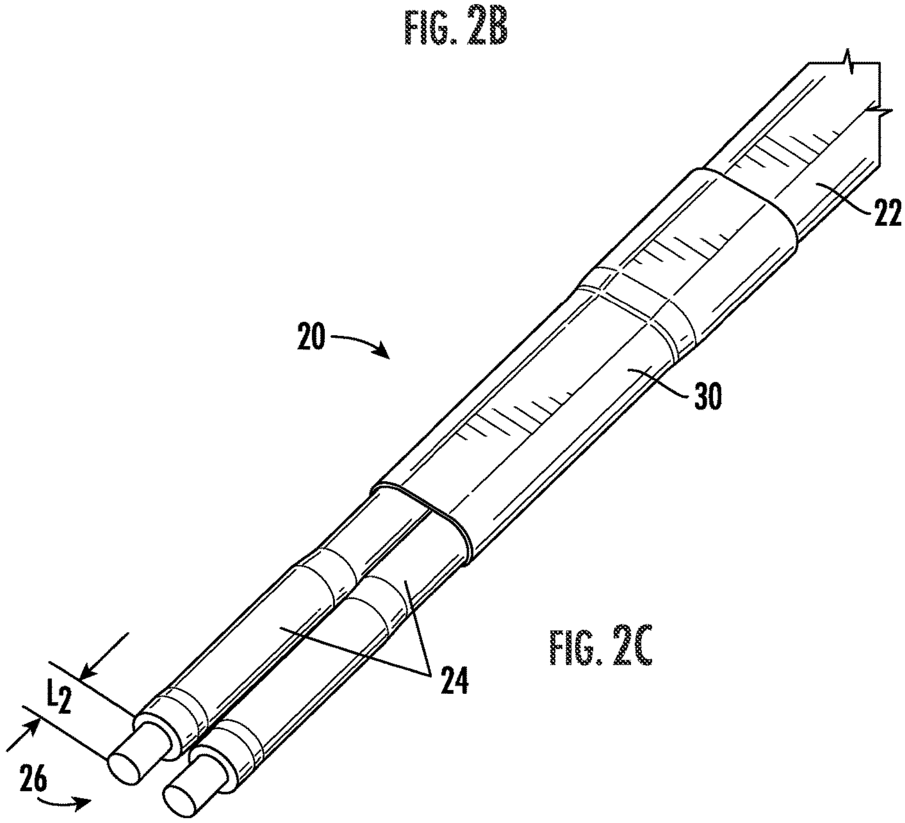

FIGS. 2A-2C illustrate the power cable 20 being prepared to attach the power cable connector 100 described above. As shown in FIG. 2A, an outer sleeve 22 (e.g., a nylon braid) of the power cable 20 is pulled back a length ($L_1$) to expose the separate conductors 24 within the power cable 20. In some embodiments, the outer sleeve 22 is pulled back at least a length ($L_1$) of about 145 mm. As discussed above, and shown in FIG. 2B, in some embodiments, a heat shrink tube 30 may be used to help provide an additional seal with the power cable 20. In some embodiments, the heat shrink tube 30 may be slid onto the power cable 20 until the conductors 24 extend out from the heat shrink tube 30 a length ($L_{1A}$) of about 80 mm. In some embodiments, the heat shrink tube 30 may have a length ($L_{1B}$) of about 95 mm and the tube 30 may overlap the outer sleeve 22 of the power cable 20 a length ($L_{1C}$) of about 30 mm. After the heat shrink tube 30 is positioned on the power cable 20, heat may then be applied to secure the tube 30 in place on the power cable 20. As shown in FIG. 2C, the conductors 24 are then stripped back a length ($L_2$) to expose the inner conductors 26. In some embodiments, the conductors 24 are stripped back a sufficient length ($L_2$) to allow the inner conductors 26 to be coupled with a respective female conductor pin 106 of the power cable conductor 100 (see, e.g., FIGS. 4A-4B). For example, in some embodiments, the conductors 24 may be stripped back a length ($L_2$) of about 10 mm.

Figure 3A:
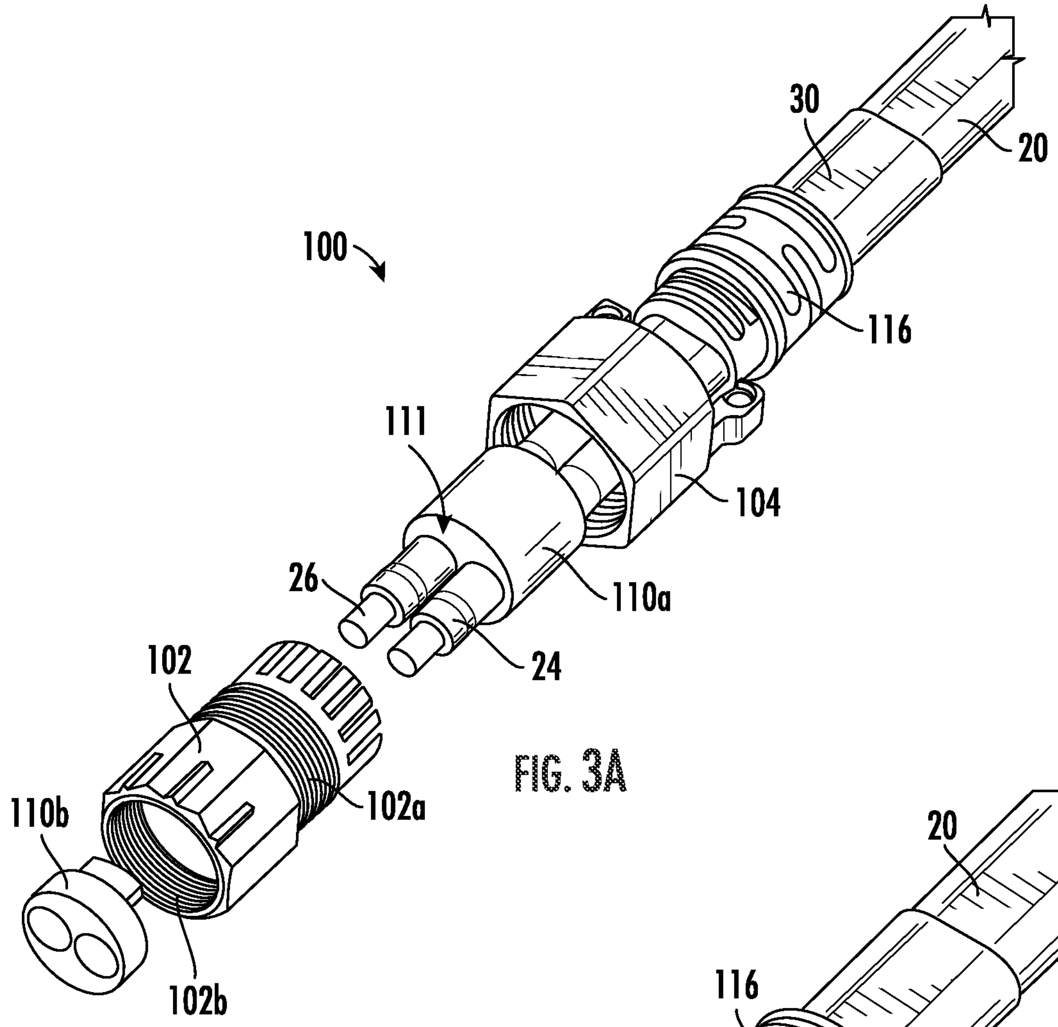
Figure 3B:
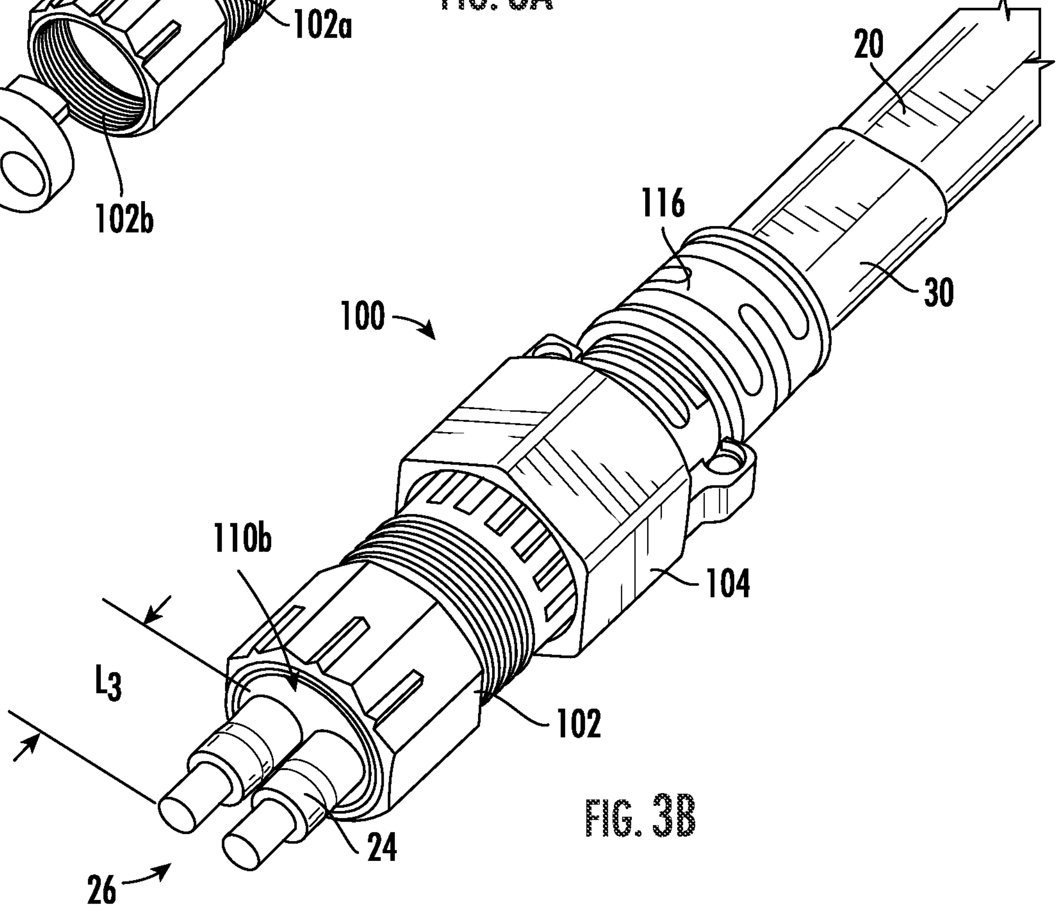

FIGS. 3A-3B illustrate parts of the power cable connector 100 being slid onto the prepared power cable 20 in the following order: (1) the strain relief boot 116; (2) the back cover 104; (3) the first seal 110*a*; (4) the main body 102; and (5) the second seal 110*b*. As discussed above, and shown in FIGS. 3A-3B, the apertures 111 of the first and second seals 110*a*, 110*b* are sized to slide onto and form an interference fit with the conductors 24. Different sized seals 110*a*, 110*b* (i.e., different sized apertures 111 of seals 110*a*, 110*b*) may be used to accommodate different sized conductors 24. Note, in some embodiments, the seals 110*a*, 110*b* may be the same color (i.e., color-coded) to help indicate to a technician determine during installation which seals 110*a*, 110*b* will accommodate the same sized conductor 24. In some embodiments, the parts (i.e., 116, 104, 110*b*, 102, and 110*a*) are slid onto the power cable 20 until a sufficient length ($L_3$) of prepared power cable 20 extends outwardly from the main body 102 of the connector 100. For example, in some embodiments, the parts (i.e., 116, 104, 110*b*, 102, and 110*a*) are slid onto the power cable 20 until the stripped conductors 24, 26 extend outwardly from the main body 102 a length ($L_3$) of about 25 mm.

Figure 4A:
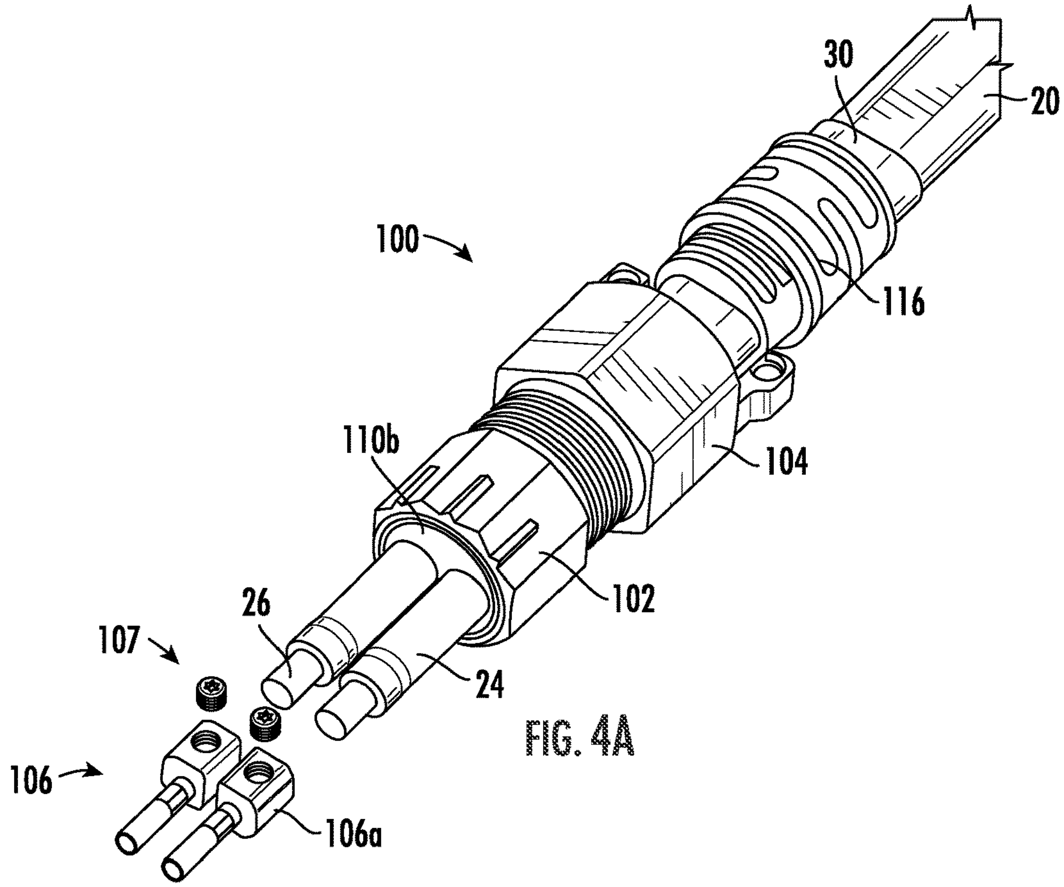
Figure 4B:
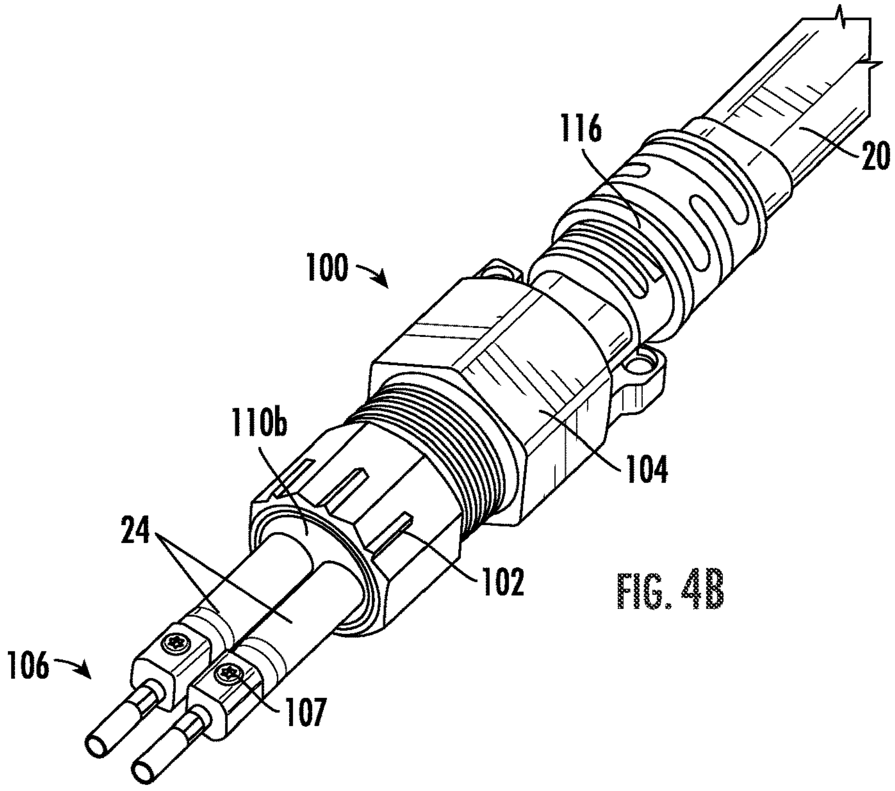

FIGS. 4A-4B illustrate the female conductor pins 106 of the connector 100 being coupled (or attached) to the inner conductors 26 of the conductor power cable 20. Each pin 106 has a polarity (i.e., one negative and one positive) that corresponds to a similar polarity of the inner conductors 26. The inner conductors 26 are received by a respective recess 106*a* in the female conductor pins 106 until an outer edge of the pins 106 contact the outer jacket of the conductor 24. Screws 107 are used to secure the conductors 26 within the recesses 106*a* of the female conductor pins 106. Different sized screws 107 may be used depending on the size of the conductors 26 being secured to the female conductor pins 106. For example, a short version of the screws 107 may be used to tighten copper sections of the wires (i.e., the inner conductors 26) having a size between about 16 $mm^2$ and about 25 $mm^2$, whereas a longer version of the screws 107 may be used to tighten inner conductors 26 having a size between about 6 $mm^2$ and about 10 $mm^2$. In some embodiments, the screws 107 may be tightened to about 5 Nm. In some embodiments, the screws 107 may have a TORX shape which allows the use of a dynamometric key preset at 5 Nm. The TORX shape of the screws 107 may help improve reliability and repeatability of the tightening force used to secure the inner conductors 26 to the female conductor pins 106.

Figure 5A:
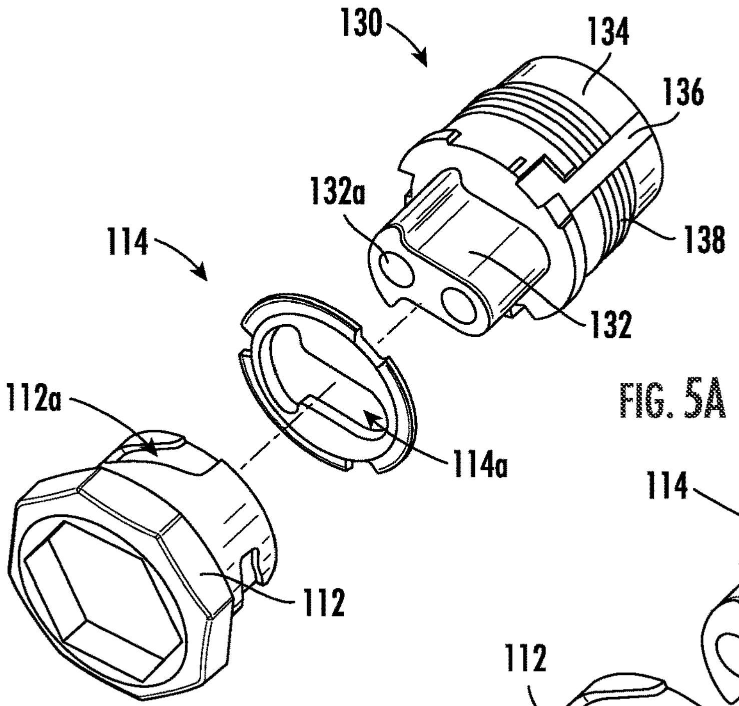
Figure 5B:
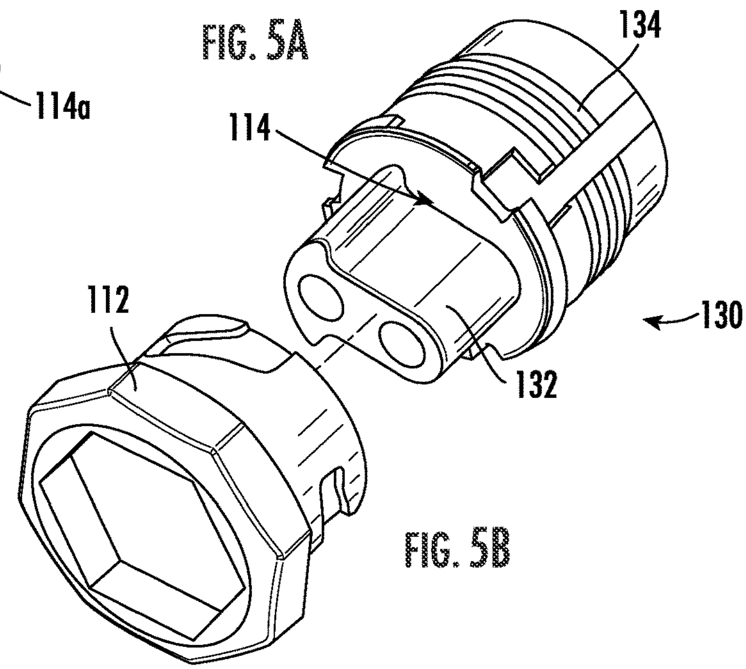
Figure 5C:
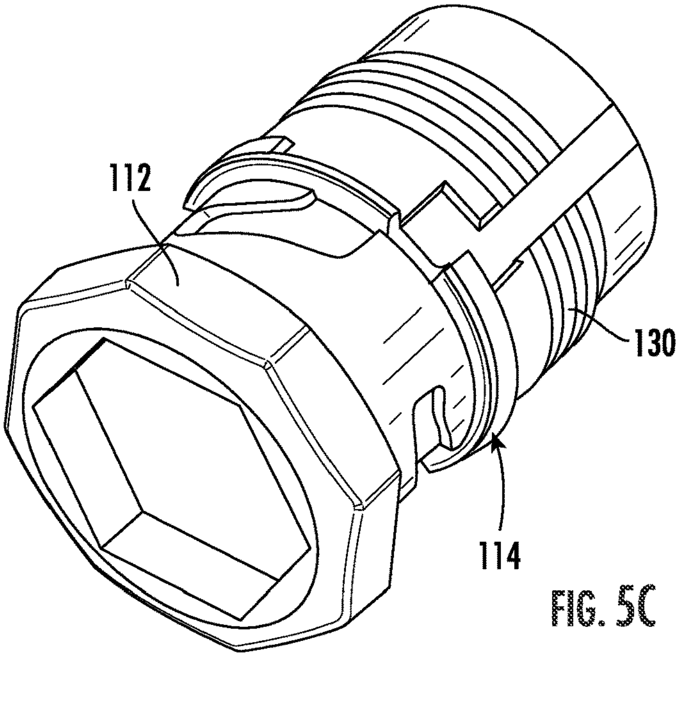

FIGS. 5A-5C and FIGS. 6A-6F illustrate the assembly and securing of the end cap 112 to the insulator 130. As shown in FIGS. 5A-5C, in some embodiments, the insulator 130 has a body 134 and a pin section 132 extending axially from the body 134. The body 134 of the insulator 130 may comprise one or more recesses 136 that extend along an outer surface of the body 134. As discussed herein, in some embodiments, the body 134 of the insulator 130 may also comprise a threaded section 138 that corresponds to the second threaded section 102*b* of the main body 102 of the connector 100. The pin section 132 comprises two interior channels 132*a* configured to receive the pair of female conductor pins 106. In some embodiments, the interior channels 132*a* may be configured to form an interference fit with the female conductor pins 106.

Still referring to FIGS. 5A-5C, in some embodiments, a third seal 114 may reside between the end cap 112 and the insulator 130. As shown in FIGS. 5A-5B, the third seal 114 has an aperture 114*a* corresponding to the shape of the pin section 132 of the insulator 130. In FIG. 5C, the end cap 112 is slid onto the pin section 132 of the insulator 130 until the third seal 114 is secured therebetween. In some embodiments, the third seal 114 may be an O-ring. In some embodiments, at least a portion of the end cap 112 may be hex-shaped.

Referring to FIGS. 6A-6F, in some embodiments, the end cap 112 may be secured to the insulator 130 via a locking nut 140. The locking nut 140 has an annular body 142 and comprises one or more protrusions 144 extending radially inward from the annular body 142. As discussed above, the insulator 130 may comprise one or more recesses 136. In some embodiments, the end cap 112 also may comprise one or more recesses 112*a*. As discussed below, the recesses 136, 112*a* may be configured to receive (and guide) the protrusions 144 of the locking nut 140 as the locking nut 140 is inserted onto the insulator 130 and end cap 112.

Figure 6A:
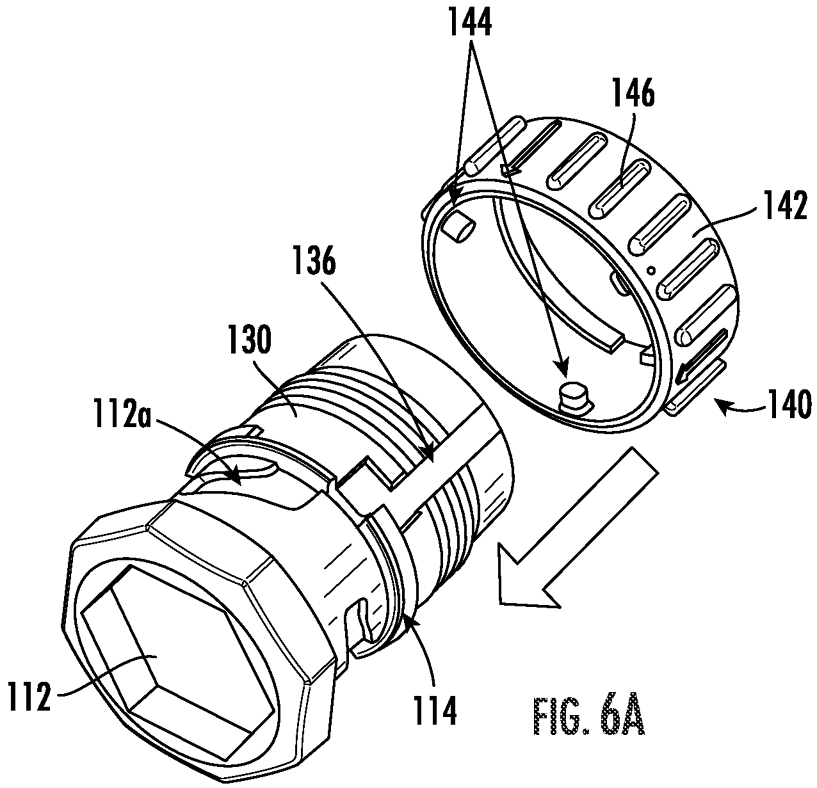
Figure 6B:
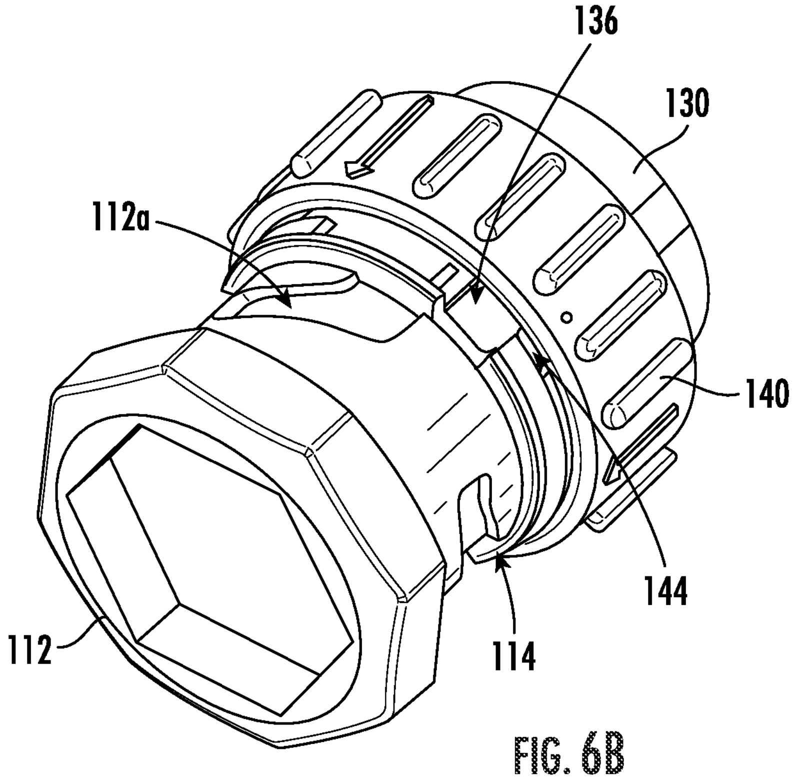
Figure 6C:
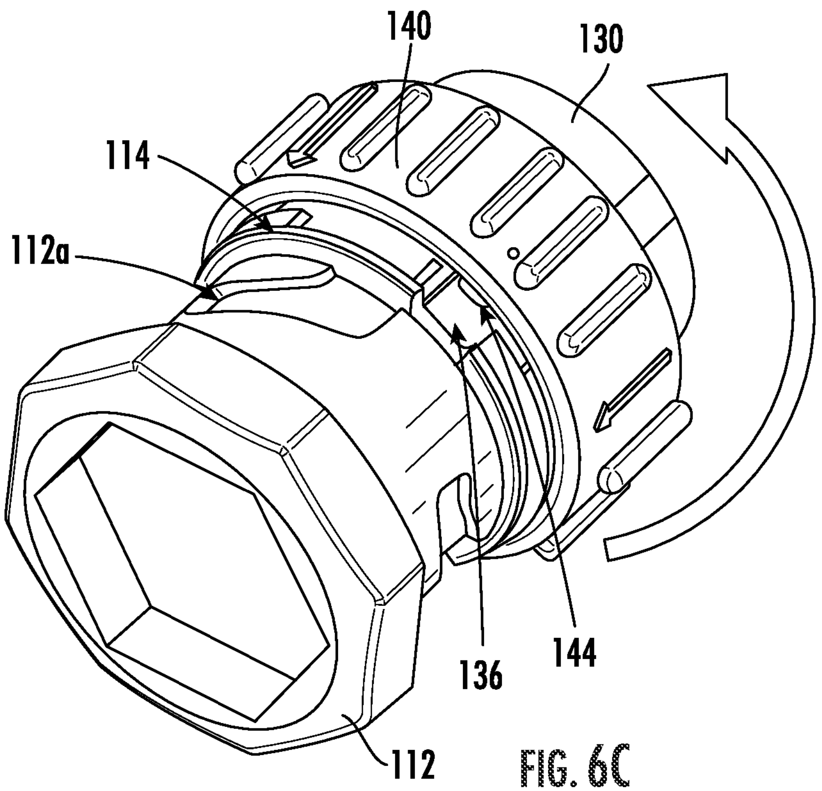
Figure 6D:
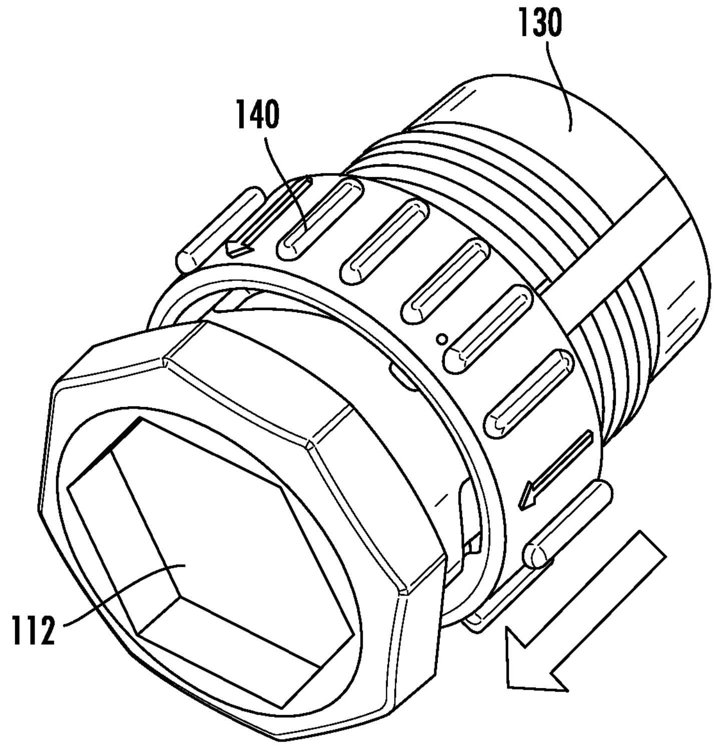
Figure 6E:
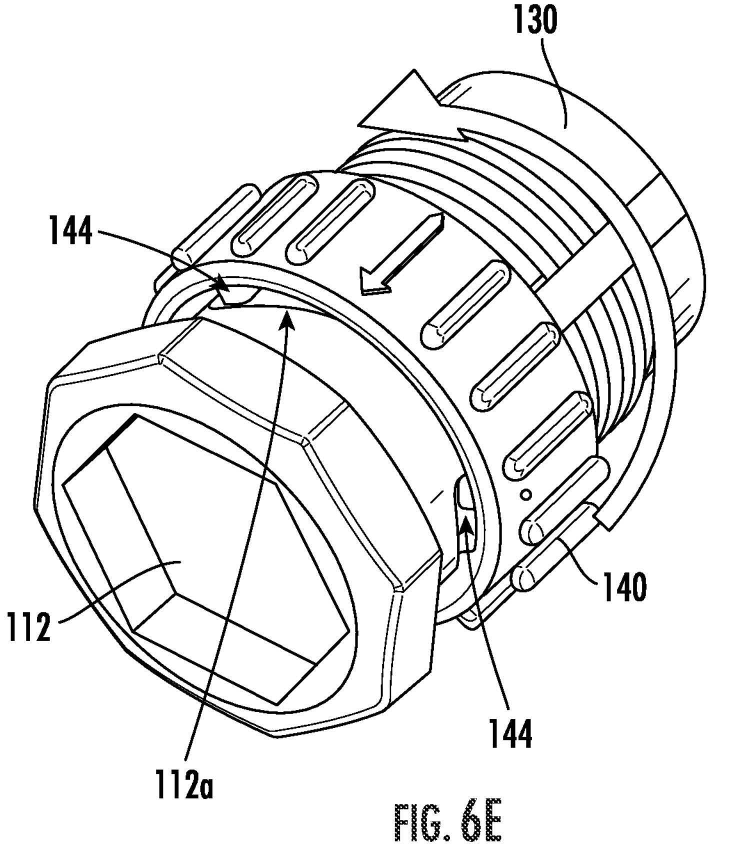
Figure 6F:
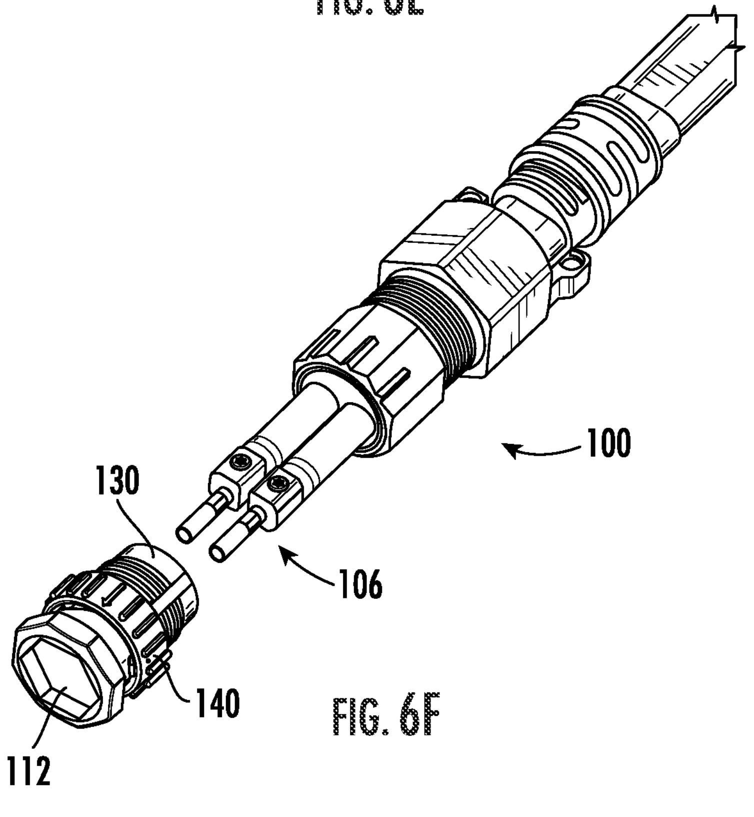

After the insulator 130, the third seal 114, and the end cap 112 are combined together, the locking nut 140 may be used to secure the end cap 112 to the insulator 130. As shown in FIG. 6A, each protrusion 144 of the locking nut 140 may be aligned with a respective recess 136 of the insulator 130. As shown in FIG. 6B, the locking nut 140 is slid onto the insulator 130 with the protrusions 144 sliding within the recesses 136 of the insulator 130 (i.e., guiding the locking nut 140) until the protrusions 144 reach the opposing edge of the insulator 130 and third seal 114. As shown in FIG. 6C, the locking nut 140 is then rotated along the third seal 114 until each protrusion 144 of the locking nut 140 is aligned with a respective recess 112*a* of the end cap 112. As shown in FIG. 6D, the locking nut 140 is then slid onto the end cap 112 with the protrusions 144 sliding within the recesses 112*a* of the end cap 112 (i.e., continuing to guide the locking nut 140). As shown in FIG. 6E, the locking nut 140 is then rotated as the protrusions 144 continue to slide within the recesses 112*a* of the end cap 112 until the protrusions 144 reach the end of the recesses 112*a*, thereby locking the locking nut 140 in place on the end cap 112 and securing the end cap 112 to the insulator 130. FIG. 6F shows the end cap 112 secured to the insulator 130 by the locking nut 140 and ready to be combined to the power cable connector assembly 10.

In some embodiments, the locking nut 140 may further comprise a plurality of ribs 146. The ribs 146 may help to enhance a technician's grip on the locking nut 140, for example, when the technician is rotating the locking nut 140 on the end cap 112.

Figure 7A:
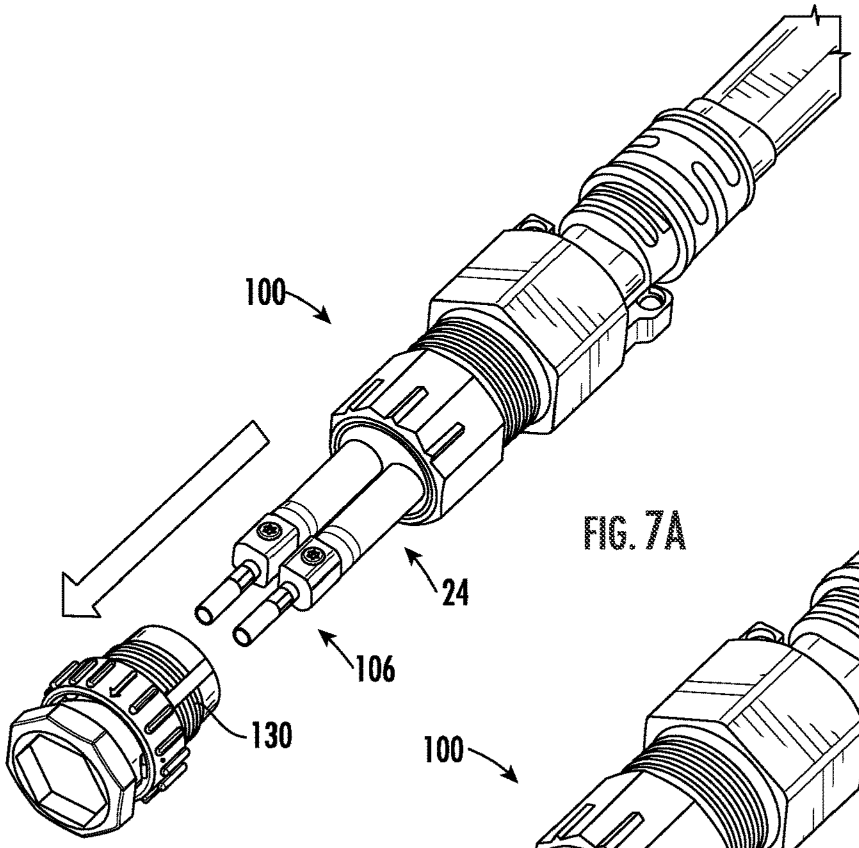
Figure 7B:
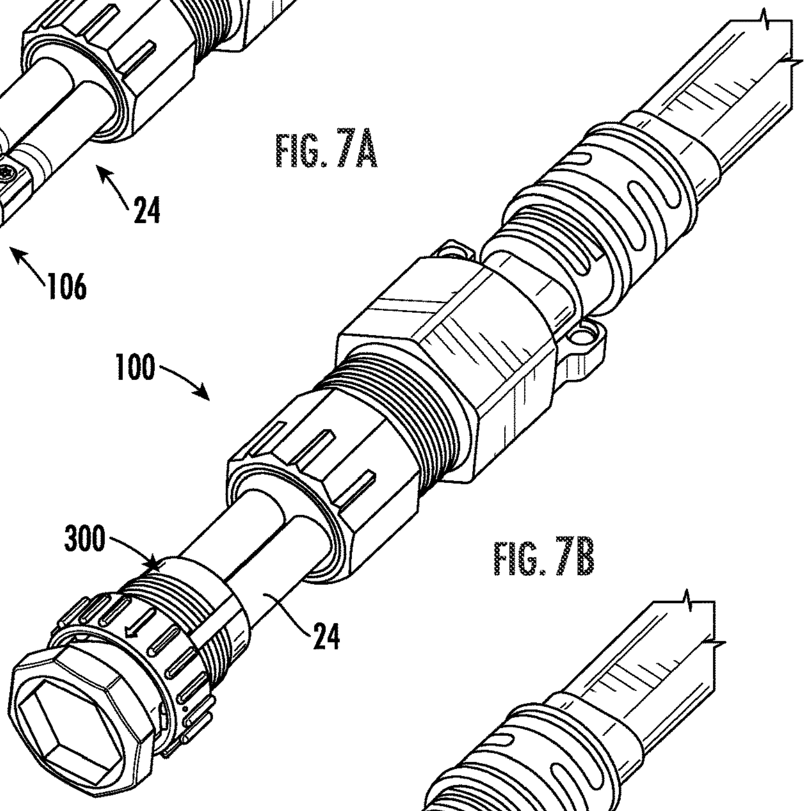

FIGS. 7A-7B show the female conductor pins 106 being inserted into the insulator 130. The female conductor pins 106 are inserted until at least a portion is received within the interior channels 132*a* of the pin section 132 of the insulator 130 (see also, e.g., FIG. 10C). As discussed herein, in some embodiments, the insulator 130 may form an interference fit with the female conductor pins 106. As shown in FIGS. 7A-7B, the insulator 130 surrounds the connection between the female conductor pins 106 and the inner conductors 26. As discussed herein, in some embodiments, the interior channels 132*a* of the insulator 130 are configured such that the female connector pins 106 may only be inserted one way.

Figure 8A:
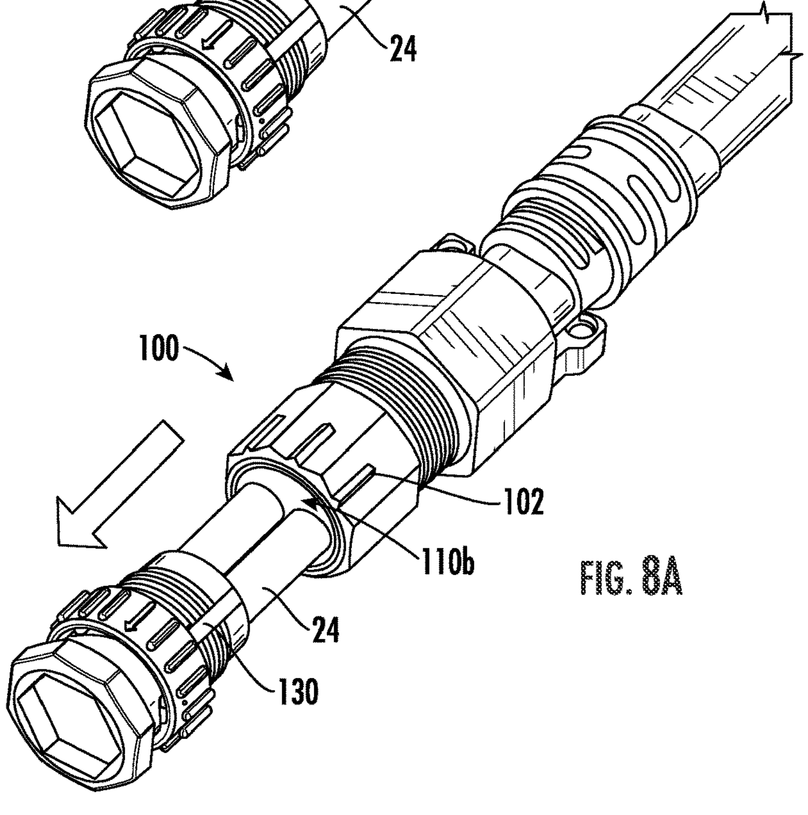
Figure 8B:
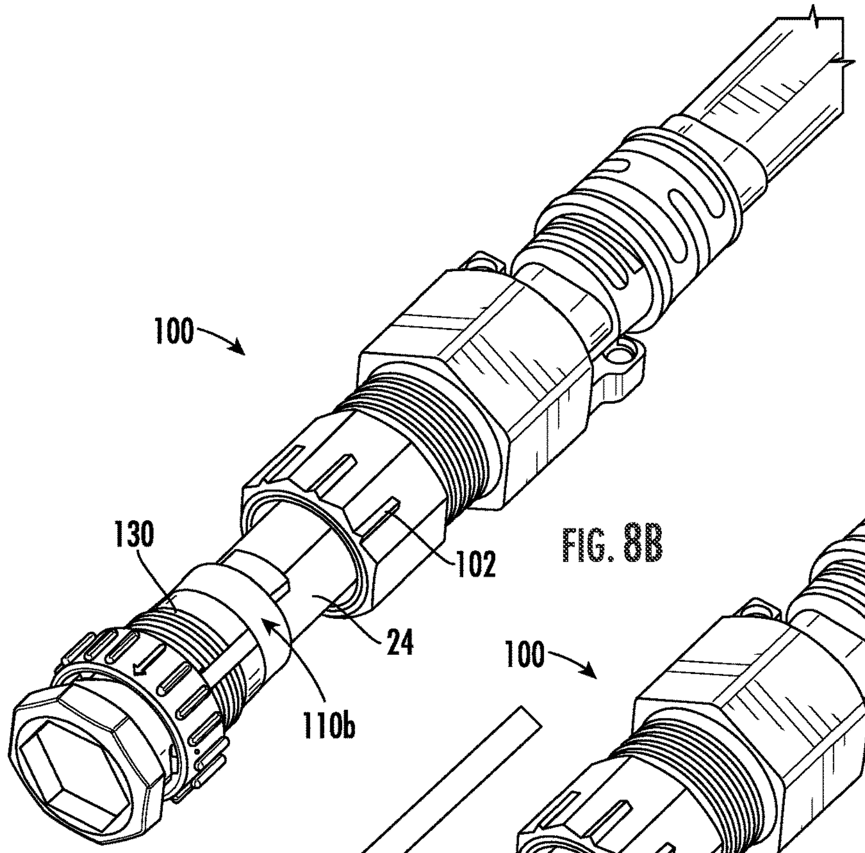
Figure 9A:
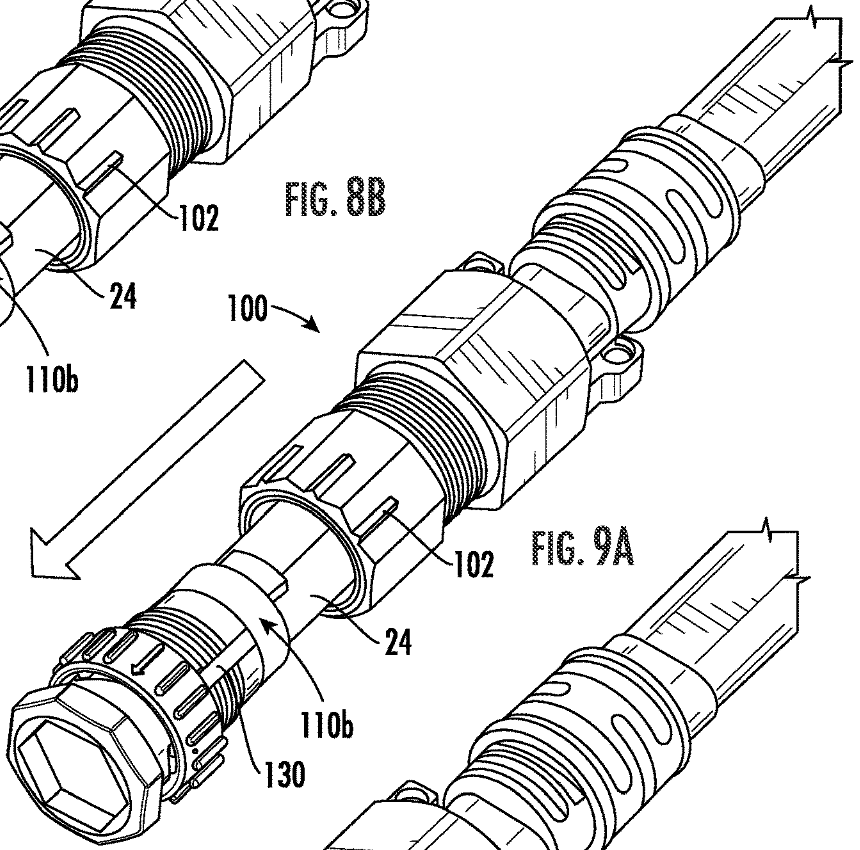
Figure 9B:
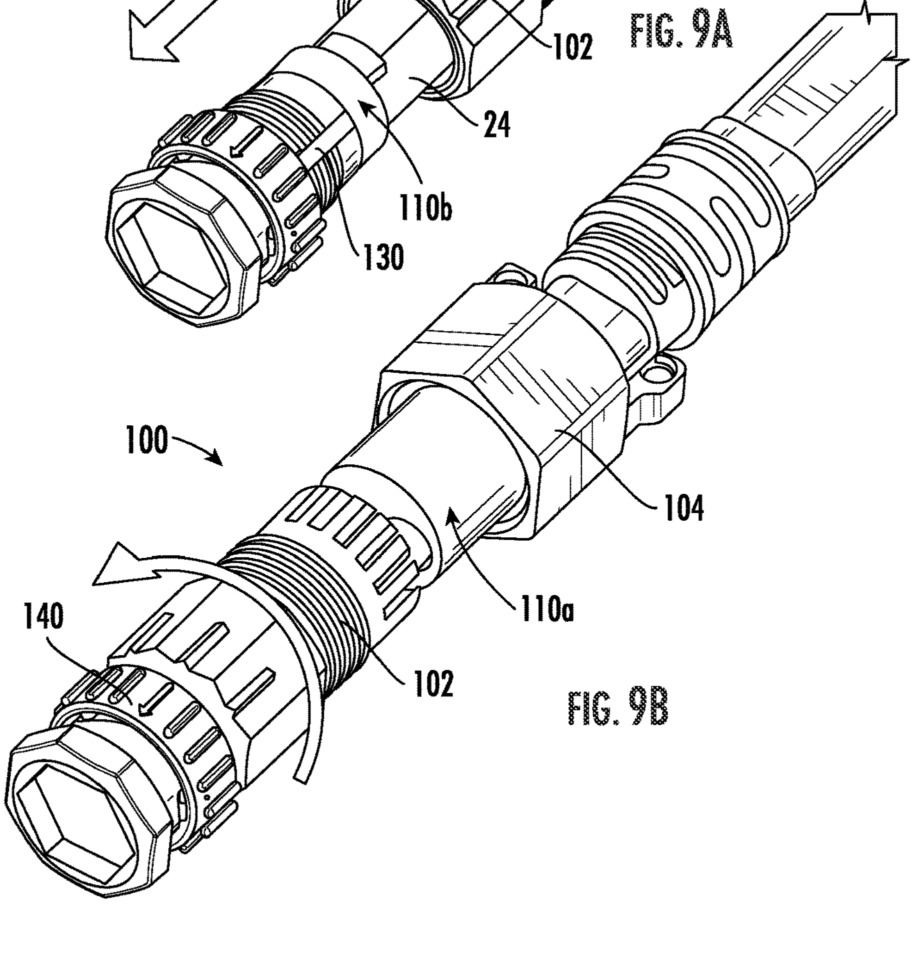

Referring now to FIGS. 8A-13B, the steps for securing together the remaining parts of the connector 100 are illustrated. First, as shown in FIGS. 8A-8B, the second seal 110*b* is slid until as least a portion of the seal 110*b* is received within the body 134 of the insulator 130 (see also, e.g., FIG. 10C). Next, the main body 102 is slid over the second seal 110*b* and engages a portion of the insulator 130 (FIGS. 9A-9B). As shown in FIG. 9B, the main body 102 is rotated such that the second threaded section 102*b* engages the corresponding threaded section 138 of the insulator 130, thereby securing the main body 102 to the insulator 130.

Figure 10A:
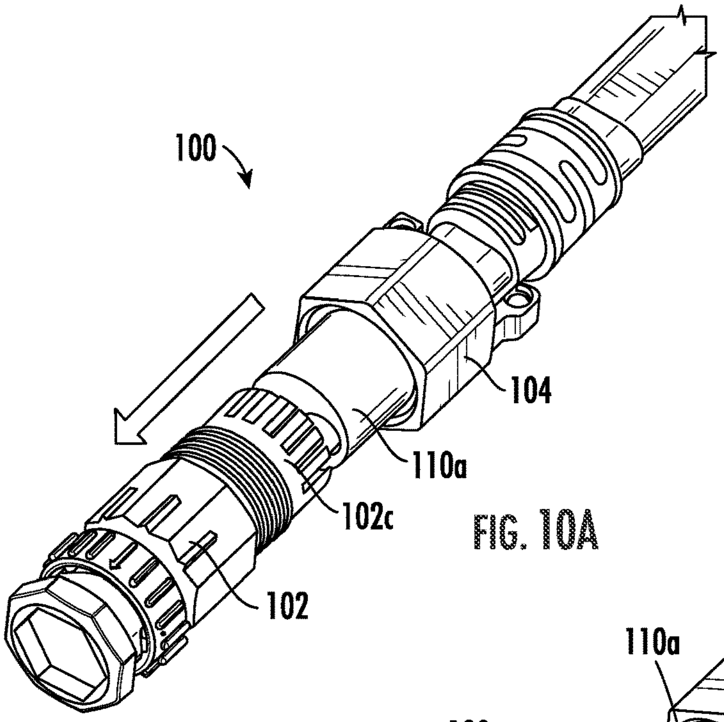
Figure 10B:
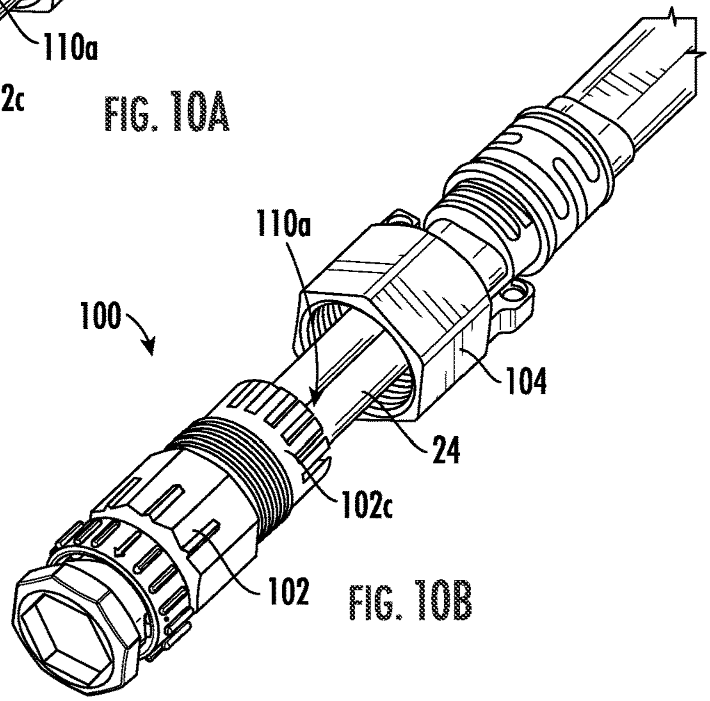
Figure 10C:
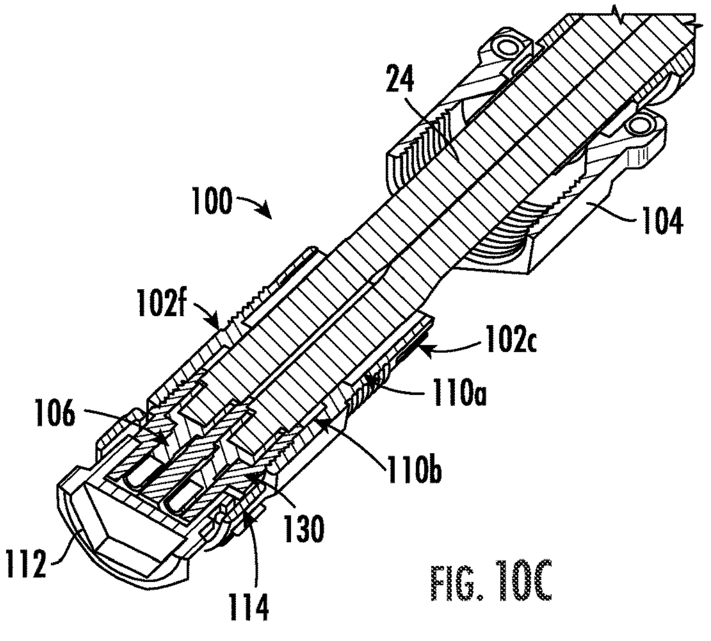
Figure 11A:
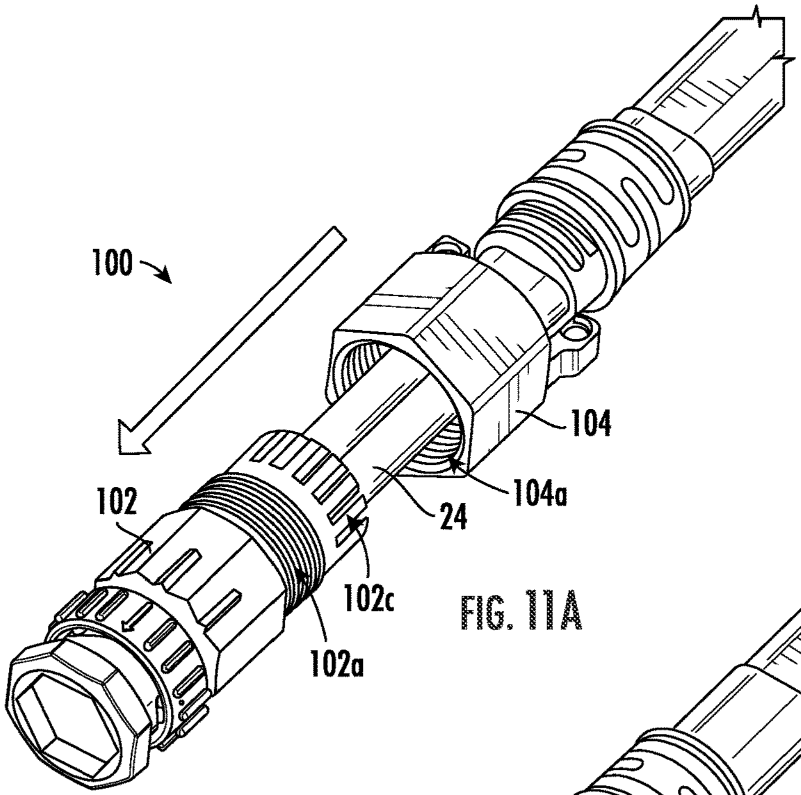
Figure 11B:
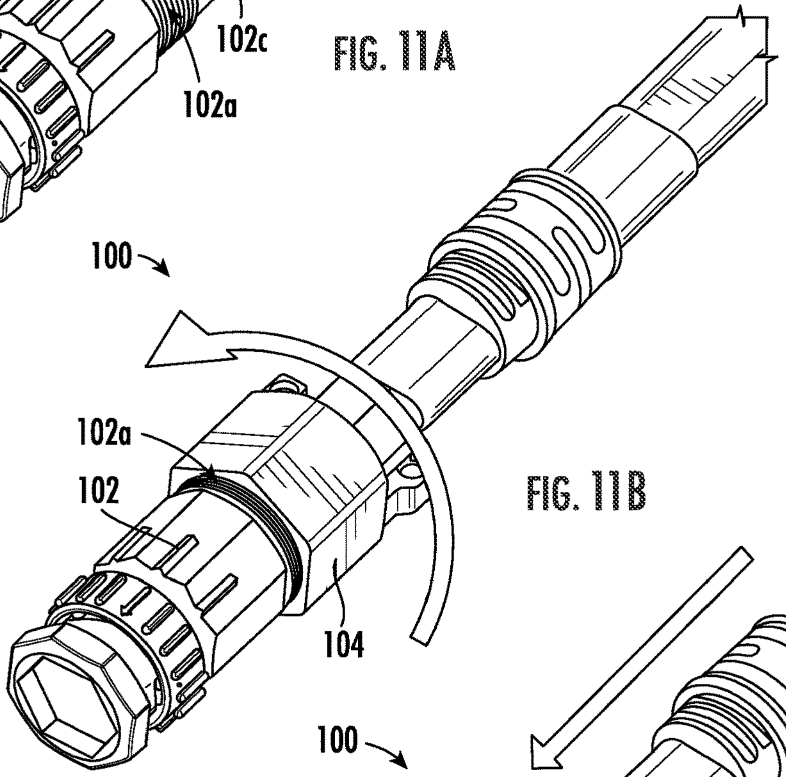

Next, as shown in FIGS. 10A-10C, the first seal 110*a* is slid into the main body 102 of the connector until the seal 110*a* contacts an inner annular flange 102*f* of the main body 102 (FIG. 10C). In some embodiments, the main body 102 may comprise a clamp ring (or a plurality of spring fingers) 102*c* that surrounds the seal 110*a*. Next, as shown in FIGS. 11A-11B, the back cover 104 is slid to engage a portion of the main body 102. The back cover 104 is then rotated such that the threaded section 104*a* of the back cover 104 engages the corresponding first threaded section 102*a* of the main body 102, thereby securing the back cover 104 to the main body 102. In some embodiments, as the back cover 104 is rotated onto the main body 102, the flexible clamp ring 102*c* is compressed against the first seal 110*a* to create an even tighter seal between the connector 100 and the conductors 26.

Figure 12A:
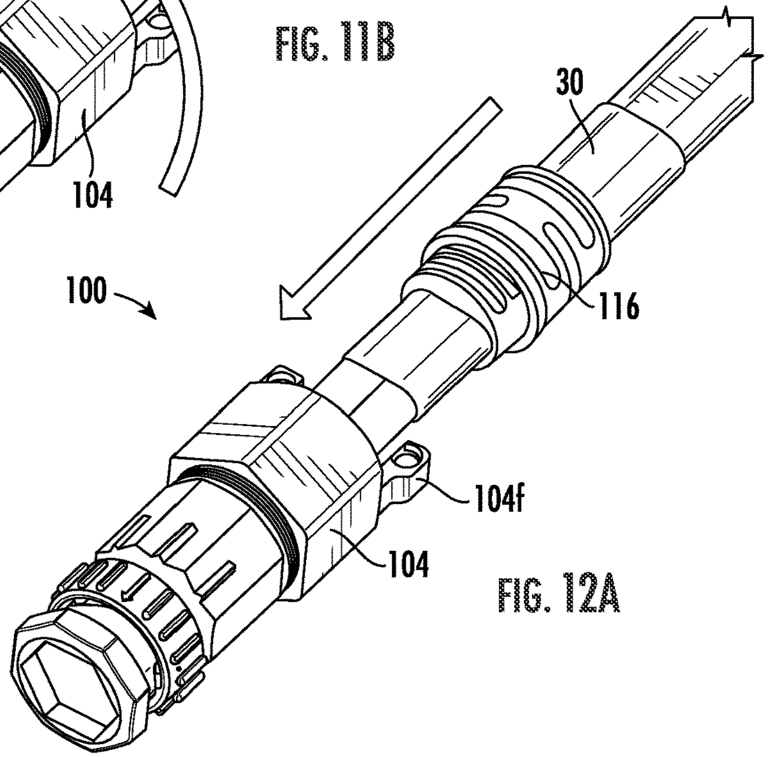
Figure 12B:
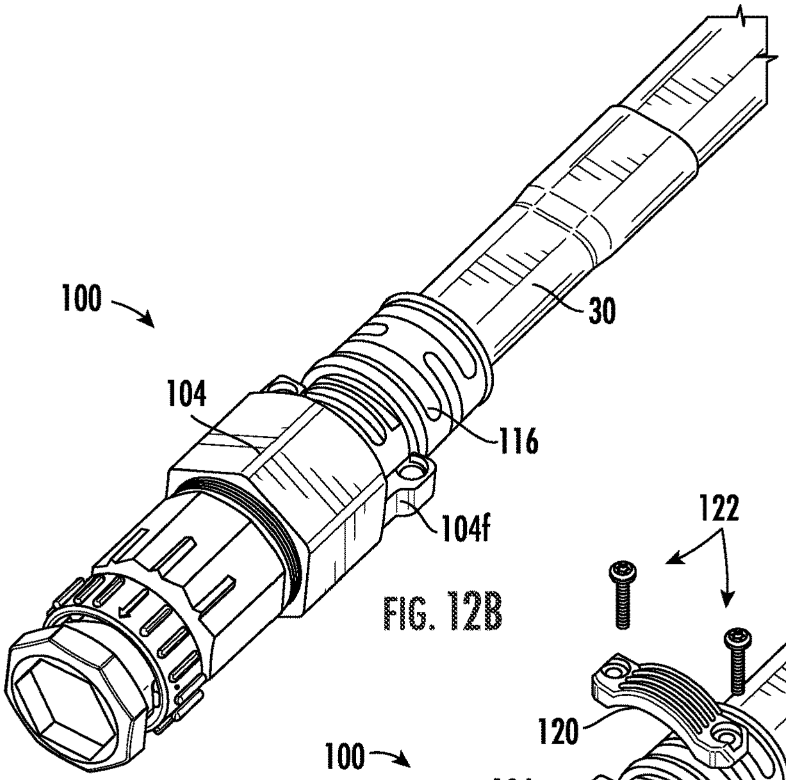
Figure 13A:
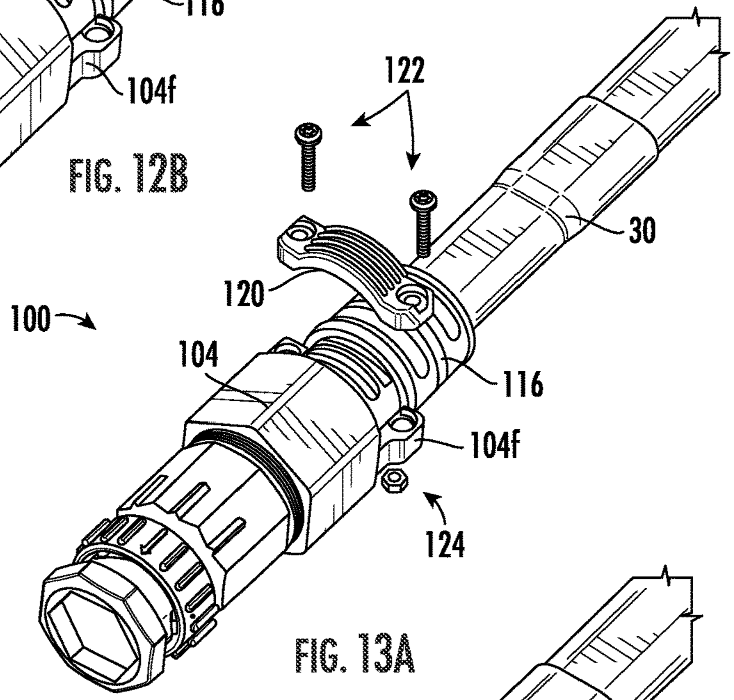
Figure 13B:
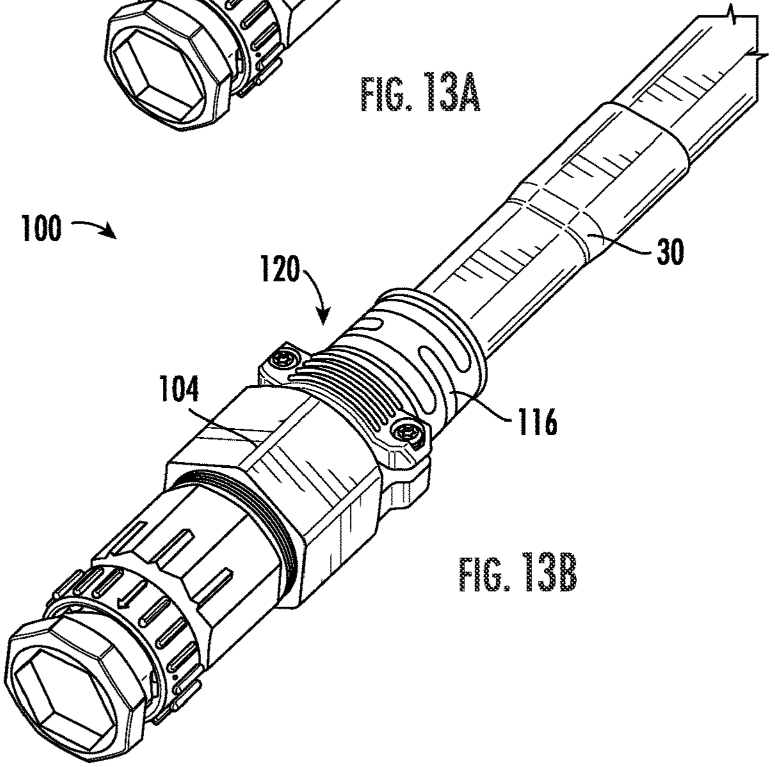

As a final step, and as shown in FIGS. 12A-13B, the strain relief boot 116 and clamp 120 are secured to the connector 100. FIGS. 12A-12B illustrate the strain relief boot 116 being slid until at least a portion of the boot 116 is inserted within the back cover 104. As shown in FIG. 12B, at least a portion of the strain relief boot 116 still overlaps the heat shrink tube 30. After the strain relief boot 116 is positioned, the clamp 120 may be secured to the connector 100. As shown in FIGS. 13A-13B, the clamp 120 may be secured to the connector 100 via a pair of screws 122 and nuts 124. Similar to screws 107 used to secure the inner conductors 26 to the female conductor pins 106 described herein, the pair of screws 122 may have a TORX shape to allow the use of a dynamometric key to tighten them at a pre-determined strength. As shown in FIG. 13A, in some embodiments, the back cover 104 of the connector 100 may comprise a pair of flanges 104*f* configured to receive the screws 122 and secure the clamp 120 to the back cover 104. Other known methods may be used to secure the clamp 120 to the connector 100.

Figure 14A:
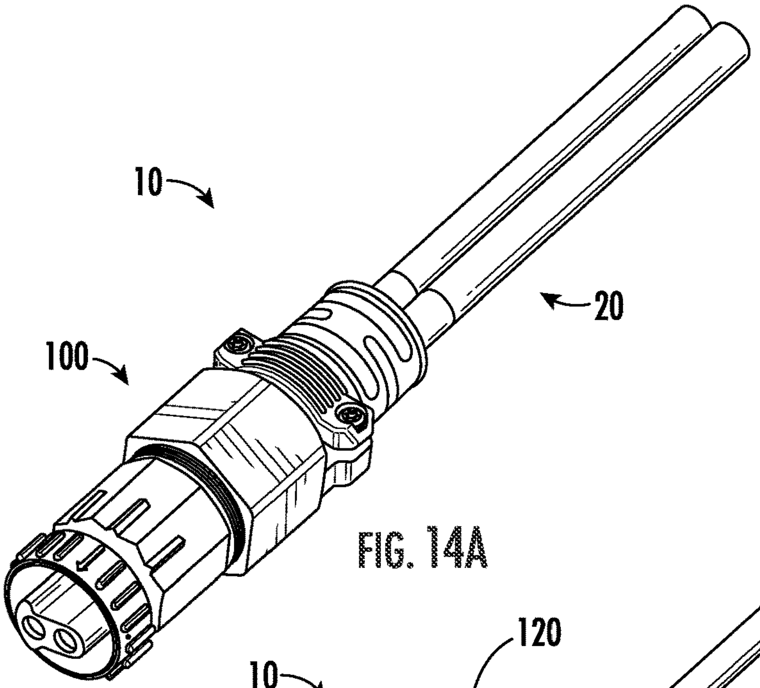
FIGS. 14A-14C illustrate an exemplary method of disassembling a connector assembly according to embodiments of the present invention.
Figure 14B:
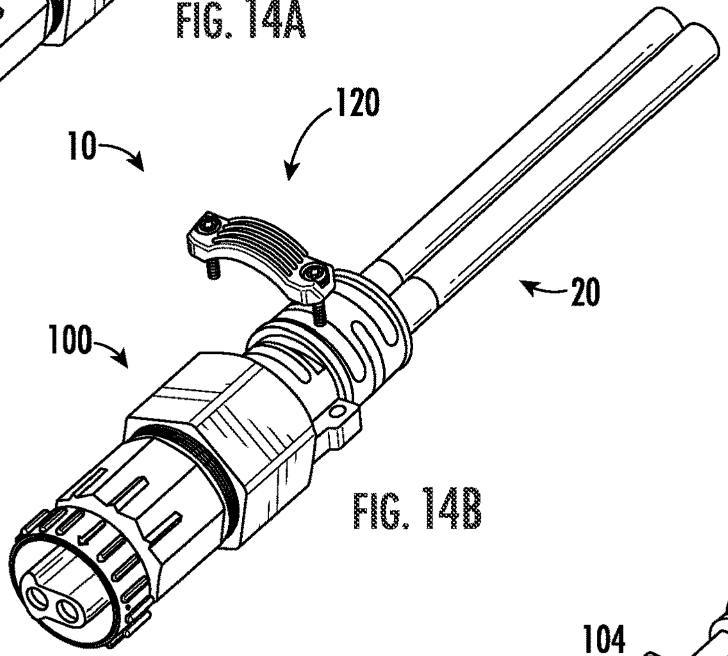
Figure 14C:
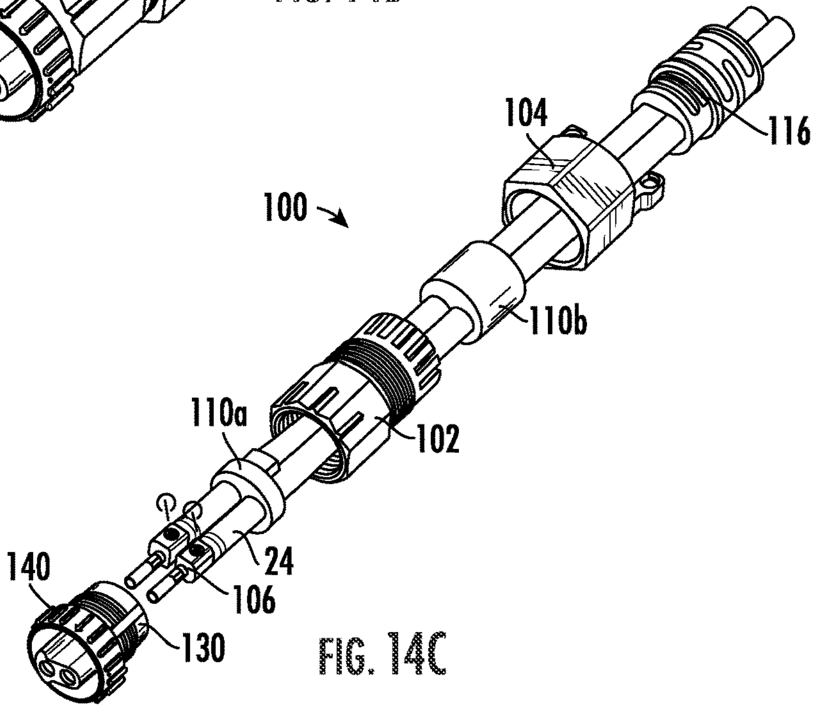

FIGS. 14A-14C illustrate disassembling a power cable connector assembly 10 according to embodiments of the present invention.

The power cable connector assembly 10 described herein may be used with direct current (DC) power conductors. In some embodiments, the assembly 10 may be used with 30-amp conductors. In some embodiments, the power cable connector assembly 10 of the present invention may be used with single-core conductor cables or dual-core conductor cables. The power cable connector assembly 10 of the present invention may be used instead of the terminal blocks described above.

Referring now to FIGS. 15A-15E, a coupler 200 that may be used with the power cable connector assembly 10 described herein is illustrated. As shown in FIGS. 15A-15E, the coupler 200 has a generally cylindrical main body 202. In some embodiments, the main body 202 of the coupler 200 may comprise a threaded portion 220 (see, e.g., FIG. 15D). A pair of mating sections 204, 206 extend axially in opposing directions from the main body 202. The end of each mating section 204, 206 comprises an aperture 207 that generally corresponds to the shape of the pin section 132 of the insulator 130 of the power cable connector assembly 10. The aperture 207 allows the pin section 132 to be received within an interior cavity 208 of each mating section 204, 206.

The coupler 200 further includes a pair of conductor pins 210 (i.e., one positive and one negative) that extend through the main body 202. Opposing ends of the conductor pins 210 reside within the respective interior cavity 208 of the mating sections 204, 206. To attach the coupler 200 to a power cable connector assembly 10 described herein, first the locking nut 140 is loosened and the end cap 112 is removed. Next, the pin section 132 of the assembly 10 is inserted through aperture 207 and into the interior cavity 208 of mating section 206. As the pin section 132 is being inserted into the interior cavity 208, each conductor pin 210 is received by a respective interior channel 132*a* of the pin section 132. The pin section 132 is inserted into the mating section 206 until the third seal 114 contacts an annular shoulder 202*a* of the main body 202 of the coupler 200.

Figure 15A:
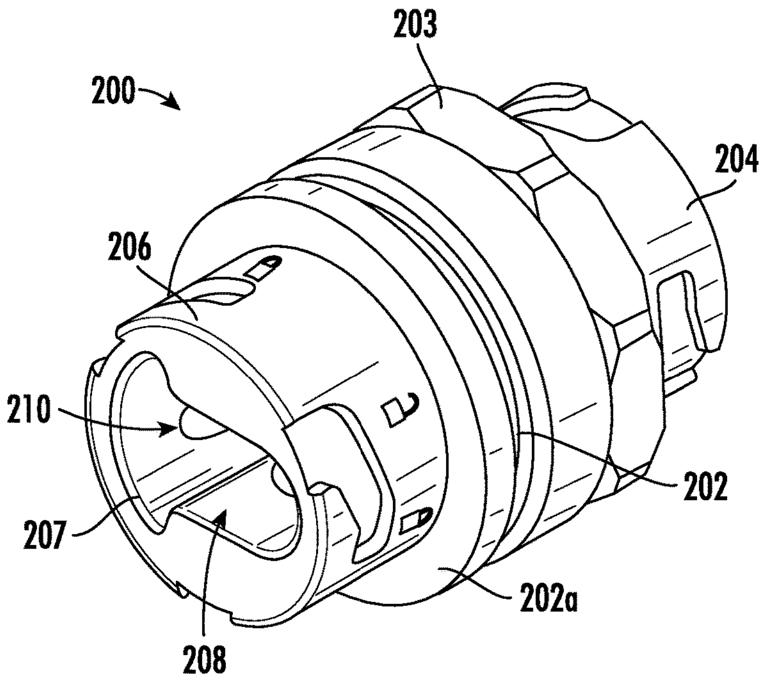
FIG. 15A is a perspective view of a coupler according to embodiments of the present invention that may be used with the connector assembly of FIG. 1A.
Figure 15B:
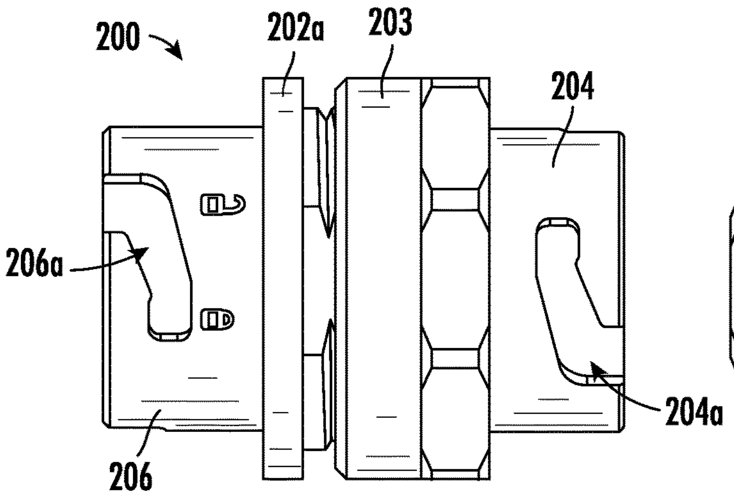
FIG. 15B is a side view of the coupler of FIG. 15A.
Figure 15C:
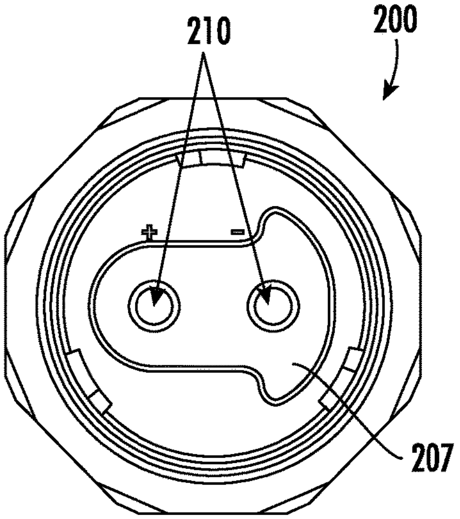
FIG. 15C is an end view of the coupler of FIG. 15A.
Figure 15D:
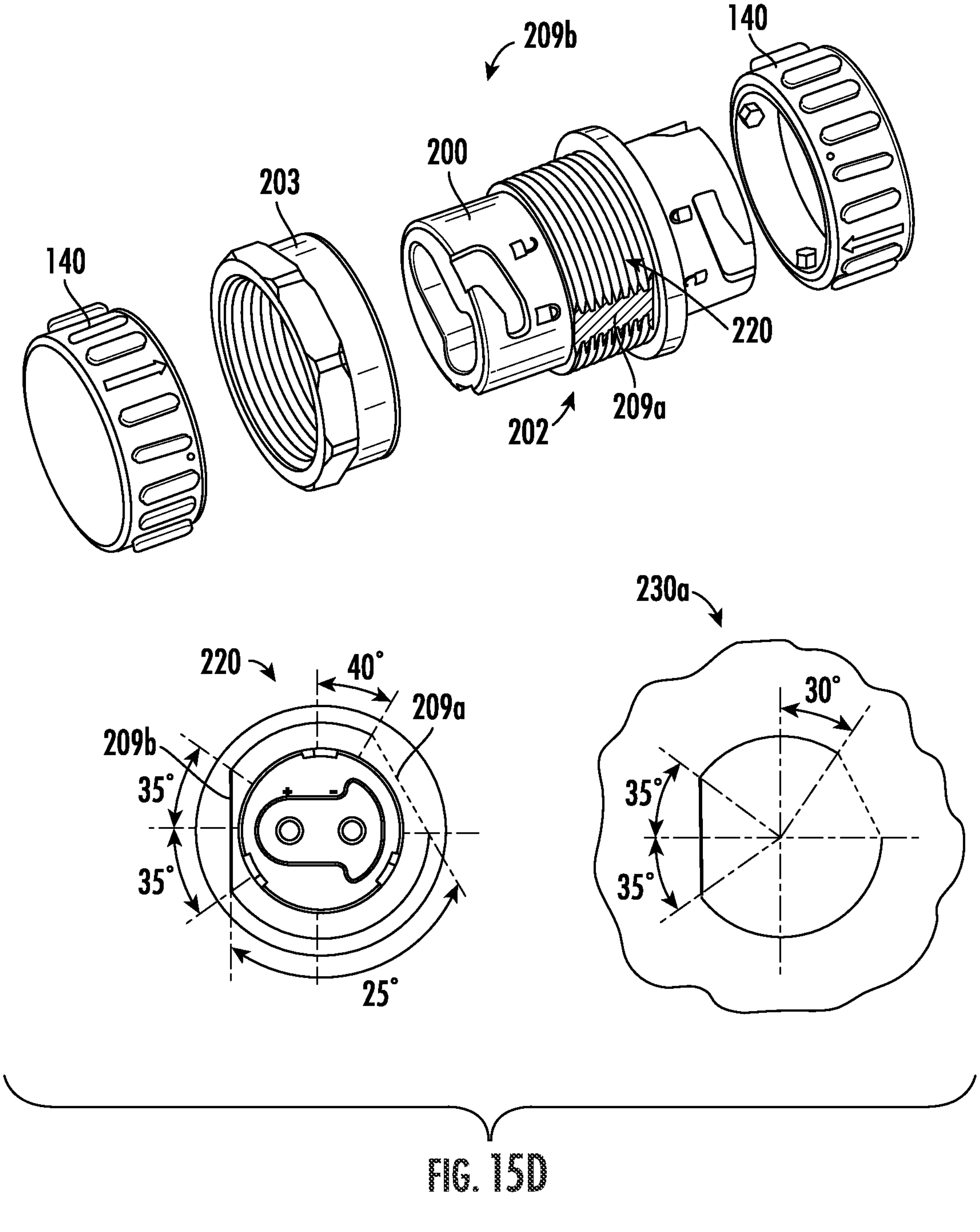
FIG. 15D is an exploded view of the coupler of FIG. 15A illustrating the coupler key and corresponding keyed hole in an infrastructure flange.
Figure 15E:
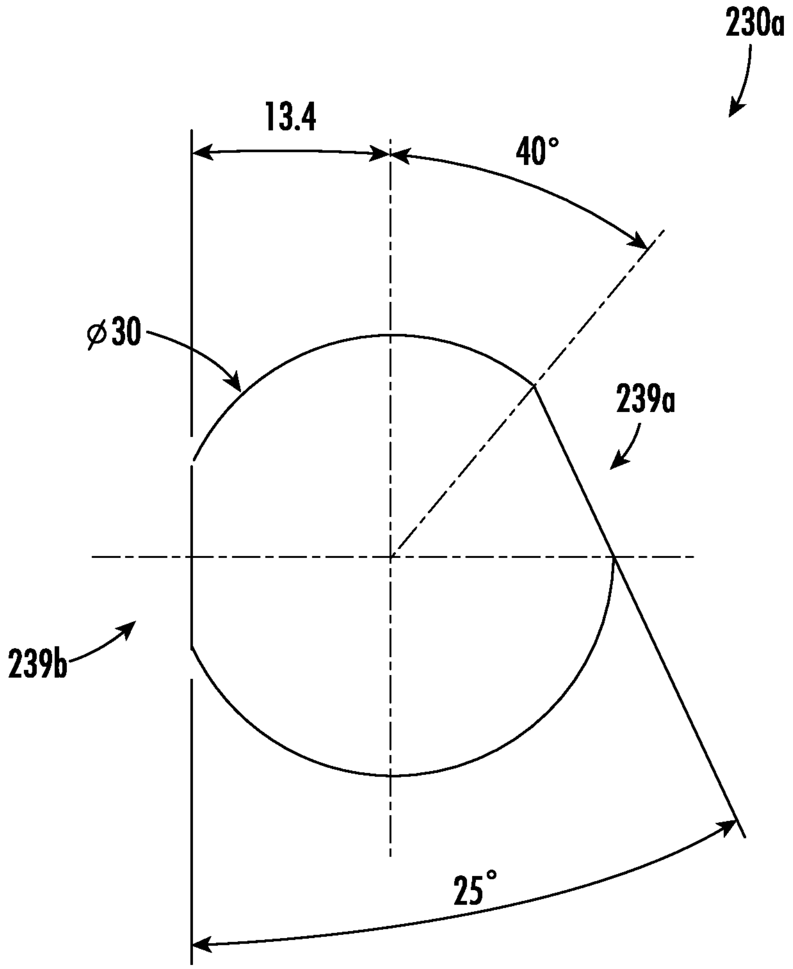
FIG. 15E illustrates exemplary dimensions of the keyed holed in the infrastructure flange.

In some embodiments, the coupler 200 may be configured to be secured to an infrastructure flange 230. In some embodiments, the infrastructure flange 230 is fixed to the mast of a base station tower (not shown). As shown in FIGS. 15D-15E, in some embodiments, the threaded portion 220 of the main body 202 of the coupler 200 may comprise two flat surfaces 209*a*, 209*b* implementing a "key" configured to match a keyed hole (or shape) 230*a* in the infrastructure flange 230 (see, e.g., FIGS. 16A-16C). The two opposite surfaces 209*a*, 209*b* mirror surfaces of the keyed hole 230*a* in the infrastructure flange 230 (see, e.g., FIG. 15D). The coupler 200 fits into the flange 230 by penetrating the shaped or keyed hole 230*a* available on the flange 230. In some embodiments, different couplers 200 may each have a different "key" that corresponds to respective keyed holes 230*a* in the infrastructure flange 230.

The "key" (i.e., flat surfaces 209*a*, 209*b* of the threaded portion 220) of the coupler 200 allows a one-way only insertion of the coupler 200 into the infrastructure flange 230 (i.e., via keyed hole 230*a*), prevents rotation of the coupler 200 during tightening of HEX nut 203, and allows a repetitive and self-oriented assembling of multiple couplers 200 in the same infrastructure flange 230 showing all the positive and negative polarities in the same orientation.

As shown in FIG. 15D, the coupler 200 may be secured to the assembly 10 in a similar manner with the end cap 112, i.e., by rotating the locking nut(s) 140 as the protrusions 144 slide within recesses 206*a* in the mating section 206. A second power cable connector assembly 10' may then be secured to the coupler 200 in a similar manner using the opposing mating section 204.

FIG. 15E illustrates an exemplary keyed hole in the infrastructure flange 230 having opposite faces 239*a*, 239*b* that match the flat surfaces 209*a*, 209*b* of threaded portion 220 of the coupler 200 described herein.

Figure 16A:
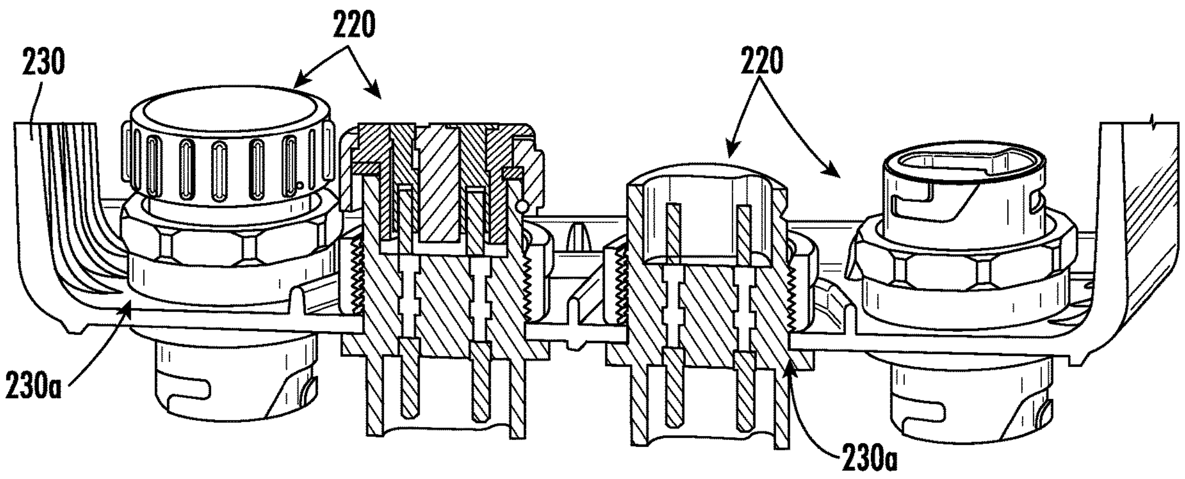
FIGS. 16A-16C are views of an exemplary infrastructure flange having multiple couplers of FIG. 15A secured thereto, wherein one of the couplers has the connector assembly of FIG. 1A secured thereto.
Figure 16B:
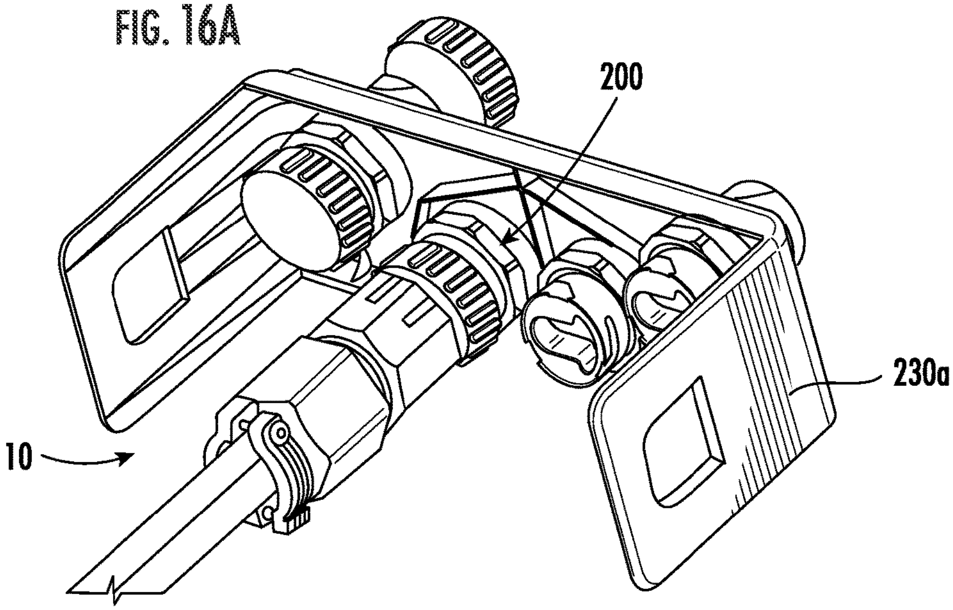
Figure 16C:
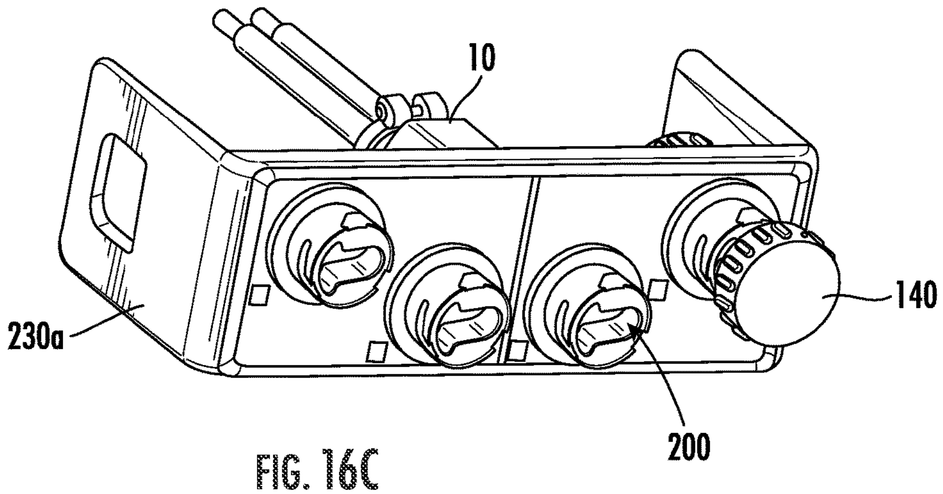

FIGS. 16A-16C illustrate an infrastructure flange 230 having four couplers 200 assembled on the flange 230 via keyed holes 230*a* according to embodiments of the present invention. FIGS. 16B-16C illustrate a power cable connector assembly 10 secured to one of the couplers 200.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A power cable connector, the connector comprising:
- a main body having a bore therethrough and comprising a first threaded section and a second threaded section;
- a back cover comprising a third threaded section configured engage the first threaded section of the main body;
- a pair of female conductor pins configured to be coupled to inner conductors of a power cable;
- an insulator comprising one or more recesses extending along an outer surface and a fourth threaded section configured to engage with the second threaded section of the main body, the insulator having a pair of inner channels extending therethrough sized to receive the pair of female conductor pins;
- an end cap comprising one or more recesses; and
- a locking nut comprising one or more protrusions extending radially inward,
- wherein, when the locking nut is inserted onto the insulator and end cap, the one or more recesses of the insulator and one or more recesses of the end cap are configured to receive and guide the one or more protrusions of the locking nut to secure the end cap to the insulator.

2. The power cable connector according to claim 1, wherein the main body is generally cylindrical.

3. The power cable connector according to claim 1, further comprising a first seal sized to fit within at least a portion of the bore of the main body.

4. The power cable connector according to claim 3, further comprising a second seal sized to fit within at least a portion of the insulator.

5. The power cable connector according to claim 4, further comprising a third seal residing between the insulator and the end cap.

6. The power cable connector according to claim 1, wherein the locking nut is configured to implement a bayonet locking mechanism with the end cap.

7. The power cable connector according to claim 1, wherein the connector is configured to accommodate different sized conductors between about 6 $mm^2$ and about 25 $mm^2$.

8. The power cable connector according to claim 1, the connector further comprising a strain relief boot.

9. The power cable connector according to claim 8, wherein the strain relief boot is secured to the back cover.

10. The power cable connector according to claim 9, wherein the strain relief boot is secured to the back cover by a clamp.

11. The power cable connector according to claim 1, in combination with a power cable having two inner conductors, wherein each inner conductor is coupled to a respective female conductor pin.

12. The power cable connector according to claim 11, further comprising a heat shrink tube extending over at least a portion of the power cable and extending within at least a portion of the back cover of the connector.

13. A power cable connector, the connector comprising:

a generally cylindrical main body having a bore therethrough;

a back cover configured to be removably secured to an end of the main body;

a first seal sized to fit within at least a portion of the bore of the main body;

a pair of female conductor pins configured to be coupled to the inner conductors of a power cable;

an insulator having a pair of inner channels sized to receive the pair of female conductor pins, wherein the insulator is configured to be removably secured to an opposing end of the main body;

a second seal sized to fit within at least a portion of the insulator;

a coupler having a main body and a pair of mating sections extending axially in opposing directions from the main body, the end of each mating section comprising an aperture configured to receive a portion of the insulator within an interior cavity of each mating section, the coupler comprising a pair of conductor pins extending through the main body, opposing ends of the conductor pins residing within respective interior cavities of the mating sections and configured to be received within a respective inner channel of the insulator; and a third seal residing between the insulator and the coupler.

14. The power cable connector according to claim 13, wherein the coupler comprises a threaded portion having two flat surfaces configured to match a keyed hole in an infrastructure flange.

15. The power cable connector according to claim 13, further comprising a locking nut configured to secure the coupler to the insulator.

16. The power cable connector according to claim 15, wherein the pair of mating sections of the coupler and the insulator each comprise one or more recesses extending along respective outer surfaces and the locking nut comprises one or more protrusions extending radially inward, and wherein, when the locking nut is inserted onto the insulator and coupler, the one or more recesses of the insulator and one or more recesses of the coupler are configured to receive and guide the one or more protrusions of the locking nut to secure the coupler to the insulator.

17. A power cable connector assembly, the assembly comprising:

a power cable connector coupler, the power cable connector coupler having a main body and a pair of mating sections extending axially in opposing directions from the main body, the end of each mating section comprising an aperture extending into an interior cavity, the power cable connector coupler comprising a pair of conductor pins extending through the main body, wherein opposing ends of the conductor pins reside within respective interior cavities of the mating sections, a pair of power cable connectors, each connector comprising:

a main body having a bore therethrough;

a back cover configured to be removably secured to an end of the main body;

a first seal sized to fit within at least a portion of the bore of the main body;

a pair of female conductor pins configured to be coupled to inner conductors of a power cable;

an insulator having a pair of inner channels sized to receive the pair of female conductor pins, wherein the insulator is configured to be removably secured to an opposing end of the main body and at least a portion of the insulator is configured to be received by the aperture and into the interior cavity of a respective mating section of the power cable connector coupler;

a second seal sized to fit within at least a portion of the insulator;

a third seal residing between the insulator and the power cable connector coupler; and a locking nut configured to secure the power cable connector coupler to the insulator; and wherein one of the power cable connectors is secured to one of the mating sections of the power cable connector coupler and the other power cable connector is secured to the opposing mating section of the power cable connector coupler.

* * * * *